US011533631B2

(12) United States Patent
Furuichi

(10) Patent No.: US 11,533,631 B2
(45) Date of Patent: Dec. 20, 2022

(54) COMMUNICATION CONTROL APPARATUS AND COMMUNICATION CONTROL METHOD FOR PARTIAL SPECTRUM USE BY DIFFERENT SYSTEMS

(71) Applicant: Sony Corporation, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 35 days.

(21) Appl. No.: 17/260,557

(22) PCT Filed: Aug. 16, 2019

(86) PCT No.: PCT/JP2019/032156
§ 371 (c)(1),
(2) Date: Jan. 15, 2021

(87) PCT Pub. No.: WO2020/045131
PCT Pub. Date: Mar. 5, 2020

(65) Prior Publication Data
US 2021/0266755 A1 Aug. 26, 2021

(30) Foreign Application Priority Data
Aug. 28, 2018 (JP) .............................. JP2018-159678

(51) Int. Cl.
H04W 40/00 (2009.01)
H04W 16/14 (2009.01)
(Continued)

(52) U.S. Cl.
CPC ........... H04W 16/14 (2013.01); H04W 28/18 (2013.01); H04W 48/02 (2013.01); H04W 68/005 (2013.01)

(58) Field of Classification Search
CPC ..... H04W 16/14; H04W 28/18; H04W 48/02; H04W 68/005
(Continued)

(56) References Cited

U.S. PATENT DOCUMENTS

2002/0057788 A1* 5/2002 Cox ...................... H04M 3/432
379/265.01
2011/0002405 A1* 1/2011 Raveendran ........... H04H 60/41
455/62
(Continued)

FOREIGN PATENT DOCUMENTS

| JP | 2015-534372 A | 11/2015 |
| JP | 2016-123110 A | 7/2016 |
| WO | WO-2015057811 A2 | 4/2015 |

OTHER PUBLICATIONS

International Search Report and Written Opinion dated Sep. 24, 2019, received for PCT Application PCT/JP2019/032156, Filed on Aug. 16, 2019, 12 pages including English Translation.
(Continued)

Primary Examiner — Mark G. Pannell
(74) Attorney, Agent, or Firm — Xsensus LLP

(57) ABSTRACT

A communication control apparatus (40) includes: a first determination unit (442) that periodically determines an operation parameter related to radio transmission of each of a single or a plurality of second wireless systems that perform wireless communication by utilizing a radio wave of a frequency band used by a single or a plurality of first wireless systems; a second determination unit (444) that determines, when a radio-wave use request is received from a new second wireless system in a determination period of the operation parameter, whether or not to define the new second wireless system as a system to be forcibly stopped when the first wireless system uses the radio wave; and a notification unit (445) that makes a notification to the new
(Continued)

second wireless system regarding a radio-wave use permission before a next determination period of the operation parameter.

17 Claims, 20 Drawing Sheets

(51) Int. Cl.
*H04W 28/18* (2009.01)
*H04W 48/02* (2009.01)
*H04W 68/00* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2012/0315944 | A1* | 12/2012 | Jeon | H04W 16/14 455/512 |
| 2014/0056154 | A1* | 2/2014 | Agarwal | H04W 72/0493 370/252 |
| 2014/0237547 | A1* | 8/2014 | Bose | H04L 41/0896 726/3 |
| 2015/0245374 | A1* | 8/2015 | Mitola, III | H04W 74/02 370/329 |
| 2016/0286549 | A1* | 9/2016 | Abraham | H04W 40/244 |
| 2018/0242165 | A1* | 8/2018 | Macmullan | H04W 72/048 |
| 2019/0335336 | A1* | 10/2019 | Cimpu | H04W 72/082 |
| 2020/0052871 | A1* | 2/2020 | Hannan | H04W 16/14 |
| 2020/0053569 | A1* | 2/2020 | Hannan | H04W 24/10 |
| 2020/0162929 | A1* | 5/2020 | Cimpu | H04W 4/021 |
| 2021/0168804 | A1* | 6/2021 | Cimpu | H04W 16/14 |

OTHER PUBLICATIONS

Wireless Innovation Forum, "Signaling Protocols and Procedures for Citizens Broadband Radio Service (CBRS): Spectrum Access System (SAS)—SAS Interface Technical Specification", WINNF-TS-0096 Version 1.3.2, Mar. 11, 2020, pp. 1-38.
Wireless Innovation Forum, "Requirements for Commercial Operation in the U.S. 3550-3700 MHz Citizens Broadband Radio Service Band", WINNF-TS-0112 Version V1.4.1, Jan. 16, 2018, 13 pages.
Electronic Communications Committee, "Technical and Operational Requirements for the Operation of White Space Devices Under Geo-location Approach", ECC Report 186, Jan. 2013, pp. 1-181.

* cited by examiner

COMMUNICATION CONTROL APPARATUS AND COMMUNICATION CONTROL METHOD FOR PARTIAL SPECTRUM USE BY DIFFERENT SYSTEMS

CROSS-REFERENCE TO RELATED APPLICATIONS

The present application is based on PCT filing PCT/JP2019/032156, filed Aug. 16, 2019, which claims priority to JP 2018-159678, filed Aug. 28, 2018, the entire contents of each are incorporated herein by reference.

FIELD

The present disclosure relates to a communication control apparatus and a communication control method.

BACKGROUND

Scarcity of radio frequency resources (wireless resources) that can be allocated to wireless systems (wireless apparatuses) has come to the surface as an issue. Incumbent wireless systems (wireless apparatuses) are already in use of every radio band, so that it is difficult to allocate the radio frequency resources to wireless systems anew. Thus, in recent years, more effective utilization of radio frequency resources by active use of a cognitive radio technology has started to attract attention. With the cognitive radio technology, timewise and spacewise underutilized radio waves (White Space) of the incumbent wireless systems are utilized to manage to have radio frequency resources.

CITATION LIST

Non Patent Literature

Non Patent Literature 1: "Signaling Protocols and Procedures for Citizens Broadband Radio Service (CBRS): Spectrum Access System (SAS)—SAS Interface Technical Specification", WINNF-TS-0096.
Non Patent Literature 2: "Requirements for Commercial Operation in the U.S. 3550-3700 MHz Citizens Broadband Radio Service Band", WINNF-TS-0112.
Non Patent Literature 3: "ECC Report 186 Technical and operational requirements for the operation of white space devices under geo-location approach", January 2013.

SUMMARY

Technical Problem

However, it is not necessarily possible to achieve efficient utilization of radio frequency resources by simply using the underutilized radio waves. For example, even though it is necessary to distribute underutilized radio waves efficiently to a plurality of wireless systems (wireless apparatuses) in order to achieve efficient utilization of the radio frequency resources, it is not easy to achieve efficient utilization of the underutilized radio waves since there are various wireless systems.

Therefore, the present disclosure proposes a communication control apparatus and a communication control method capable of achieving efficient utilization of radio frequency resources.

Solution to Problem

To solve the above problems, a communication control apparatus according to the present disclosure includes: a first determination unit that periodically determines an operation parameter related to radio transmission of each of a single or a plurality of second wireless systems that perform wireless communication by utilizing a radio wave of a frequency band used by a single or a plurality of first wireless systems; a second determination unit that determines, when a radio-wave use request is received from a new second wireless system in a determination period of the operation parameter, whether or not to define the new second wireless system as a system to be forcibly stopped when the first wireless system uses the radio wave; and a notification unit that makes a notification to the new second wireless system regarding a radio-wave use permission before a next determination period of the operation parameter.

DESCRIPTION OF EMBODIMENT

Figure 1:
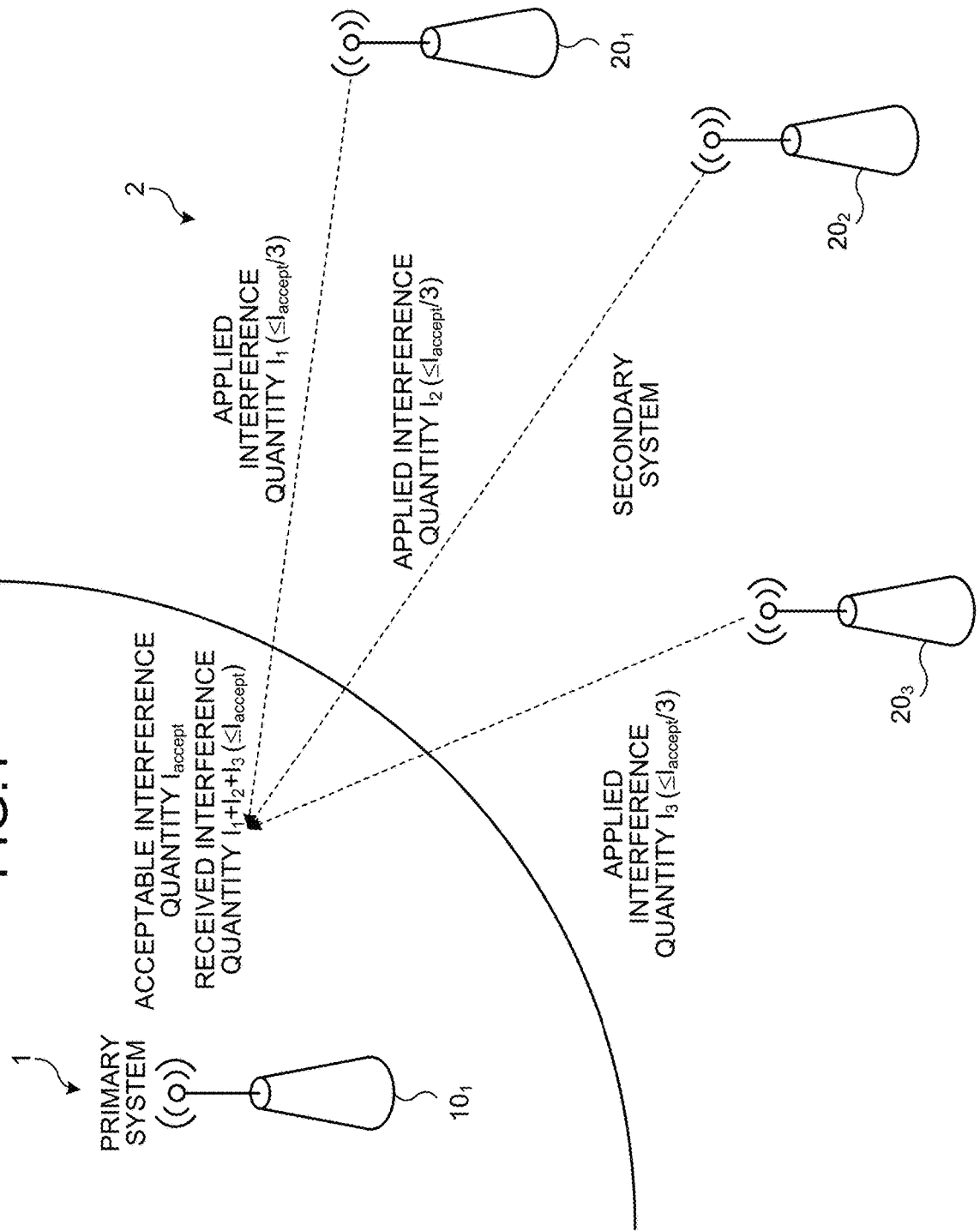
FIG. 1 is an explanatory diagram illustrating an example of distribution of interference margins to each of communication devices configuring a secondary system.

Hereinafter, an embodiment of the present disclosure will be described in detail based on the accompanying drawings. In each of the following embodiments, same reference signs are applied to the same components to avoid duplicated explanations.

Furthermore, in the specification and the drawings, a plurality of constituent elements having substantially the same functional configuration may be distinguished by adding different numerals after the same reference sign. For example, a plurality of constitutions having substantially the same functional configuration are distinguished like communication control apparatuses $40_1$ and $40_2$ as necessary. However, when it is not specifically necessary to distinguish each of the constituent elements having substantially the same functional configuration, only the same reference sign is applied. For example, when it is not specifically necessary to distinguish the communication control apparatuses $40_1$ and $40_2$, those are simply referred to as communication control apparatuses 40.

Furthermore, the present disclosure will be described according to the order of items as follows.
1. Introduction
2. Configuration of Communication System
   2-1. Overall Configuration of Communication System
   2-2. Configuration of Communication Device
   2-3. Configuration of Terminal Device
   2-4. Configuration of Communication Control Apparatus
3. Interference Model
4. Primary System Protection Methods
   4-1. Interference-Margin Simultaneous Distribution Mode
   4-2. Low-Interference Node Preferentially Permitting Mode
5. Operations of Communication System
   5-1. Communication Control Processing
   5-2. Permission Determination Processing
   5-3. Process A of Permission Determination Processing
   5-4. Process B of Permission Determination Processing
6. Modifications
   6-1. Master and Slave
   6-2. Modification regarding System Configuration
   6-3. Another Modification
7. Conclusion

1. Introduction

In recent years, scarcity of radio frequency resources (for example, frequencies) that can be allocated to wireless systems has come to the surface as an issue. However, incumbent wireless systems are already in use of every radio band, so that it is difficult to allocate new radio frequency resources. Thus, in recent years, more effective utilization of radio frequency resources by active use of a cognitive radio technology has started to attract attention.

With the cognitive radio technology, timewise and spacewise underutilized radio waves (White Space) of the incumbent wireless systems are used (for example, Dynamic Spectrum Access (DSA)) to manage to have radio frequency resources. For example, in the United States, legislation and standardization of CBRS (Citizens Broadband Radio Service) actively utilizing a frequency sharing technology are accelerated so as to open, to the general public, Federal use band (3.55 to 3.70 GHz) that overlaps the frequency band defined to be 3GPP bands 42 and 43 worldwide.

The cognitive radio technology contributes not only to Dynamic Spectrum Access but also to improving the frequency use efficiency of the wireless systems. For example, in ETSI EN 303 387 and IEEE 802.19.1-2014, a coexistence technology among wireless systems using underutilized radio waves is defined.

In order to achieve frequency sharing, it is important for communication control apparatuses (for example, frequency management databases) to control communication of a secondary system so as not to give a critical interference to a primary system. The communication control apparatus is an apparatus that manages communication and the like of a communication device. For example, the communication control apparatus is an apparatus (system) for managing radio frequency resources (for example, frequencies) such as GLDB (Geo-location Database) and SAS (Spectrum Access System). In the case of the embodiment, the communication control apparatus corresponds to a communication control apparatus 40 (for example, communication control apparatus $40_1$, $40_2$ illustrated in FIG. 4) to be described later. The communication control apparatus 40 will be described in detail later.

Note here that the primary system is a system (for example, an incumbent system) that is given a priority over other systems such as a secondary system to use radio waves of a prescribed frequency band. Furthermore, the secondary system is a system that secondarily utilizes the radio waves in the frequency band used by the primary system (for example, Dynamic Spectrum Access), for example. Each of the primary system and the secondary system may be configured with a plurality of communication devices or a single communication device. The communication control apparatus distributes an acceptable interference quantity to a single or a plurality of communication devices such that an interference aggregation for a single or a plurality of communication devices configuring the secondary system does not exceed the acceptable interference quantity (also referred to as an interference margin) of the primary system. At this time, the acceptable interference quantity may be an interference quantity that is defined in advance by the operator of the primary system or a public organization or the like that manages the radio waves. In the explanation below, "interference margin" means an acceptable interference quantity. Furthermore, the interference aggregation may also be referred to as a cumulative applied interference power.

FIG. 1 is an explanatory diagram illustrating an example of distribution of interference margins to each of the communication devices configuring the secondary system. In the example of FIG. 1, a communication system 1 is the primary system, and a communication system 2 is the secondary system. The communication system 1 includes a communication device $10_1$ and the like. Furthermore, the communication system 2 includes communication devices $20_1$, $20_2$, $20_3$, and the like. While the communication system 1 includes only a single communication device 10 in the example of FIG. 1, there may be a plurality of communication devices 10 in the communication system 1. Furthermore, while the communication system 2 includes three communication devices 20 in the example of FIG. 1, there may be less or more than three communication devices 20 in the communication system 2. While there are only one each of the primary system (the communication system 1 in the example of FIG. 1) and the secondary system (the communication system 2 in the example of FIG. 1) illustrated in the example of FIG. 1, there may be a plurality of primary systems and secondary systems.

Each of the communication device $10_1$ and the communication devices $20_1$, $20_2$, and $20_3$ is capable of transmitting and receiving radio waves. The interference quantity acceptable to the communication device $10_1$ is expressed by $I_{accept}$. Furthermore, the interference quantities given to a prescribed protection point of the communication system 1 (primary system) from the communication devices $20_1$, $20_2$, and $20_3$ are applied interference quantities $I_1$, $I_2$, and $I_3$, respectively. Note here that the protection point is an interference calculation reference point for protecting the communication system 1.

The communication control apparatus distributes the interference margin $I_{accept}$ to the communication devices 20 such that the interference aggregation (received interference quantity $I_1+I_2+I_3$ illustrated in FIG. 1) for the prescribed protection point of the communication system 1 does not exceed the interference margin $I_{accept}$. For example, the communication control apparatus distributes the interference margin $I_{accept}$ to each of the communication devices 20 such that each of the applied interference quantities $I_1$, $I_2$, and $I_3$ becomes $I_{accept}/3$. Alternatively, the communication control apparatus distributes the interference margin $I_{accept}$ to each of the communication devices 20 such that each of the applied interference quantities $I_1$, $I_2$, and $I_3$ becomes smaller than $I_{accept}/3$. Naturally, the manner of distributing the interference margin is not limited to such examples.

The communication control apparatus calculates the maximum transmission power accepted by each of the communication devices 20 (referred to as the maximum acceptable transmission power hereinafter) based on the distributed interference quantities (referred to as distributed interference quantities hereinafter). For example, the communication control apparatus calculates the maximum acceptable transmission power of each of the communication devices 20 by calculating backwards from the distributed interference quantity based on propagation loss, antenna gain, and the like. Then, the communication control apparatus notifies information on the calculated maximum acceptable transmission power to each of the communication devices 20.

In regards to SAS, standards related to information exchange among a plurality of SASs is defined in WinnForun (Wireless Innovation Forum). SAS is a frequency management database for CBRS of SAS-SAS Protocol (see Non Patent Literature 1), for example. "Full Activity Dump Message" is included therein, which provides means for dumping and synchronizing minimum required information for interference control recorded in the database. Examples of the information required for interference control are as follows.

(1) Data Record
Base Station Set Position Information
Operation Parameters (Frequency, Transmission Power)
(2) Zone Data Record
PPA (PAL Protection Area, Protection Area of System with High-Priority Secondary Use)
(3) ESC Sensor Record
Set Position Information on Sensor for Detecting Shipborne Radar Signals Note that it is considered to perform real-time management by exchanging each piece of information as appropriate. However, since a vast amount of load may be imposed, it is expected that the load for operating the database is decreased by periodically exchanging the above-described Message (for example, exchanging it once a day). If an exchange is performed once a day, for example, the communication control apparatus performs a protection calculation of the primary system once a day. In that case, all calculations with the load can be concentrated at such a period. Therefore, when a new operation permission request arrives from the communication device between the periods, for example, it is assumed to put an operation permission on hold once without rejecting it and give the operation permission after the calculation that is performed after synchronization.

However, in that case, the user of the communication device wishing to start an operation immediately even though there is a little interference needs to wait for a while until an operation permission is given (for example, the user needs to wait for one day if a protection calculation is performed once a day). Therefore, such database operations are inconvenient for such users. Furthermore, if a great number of communication devices 20 are put on hold, calculations of the interference control after synchronization may become complicated for that. Therefore, it is possible to give an operation permission for a specific communication device without pending. On the other hand, for interference control, it is important that an interference aggregation from a plurality of communication devices does not exceed the acceptable value of the primary system.

Figure 2:
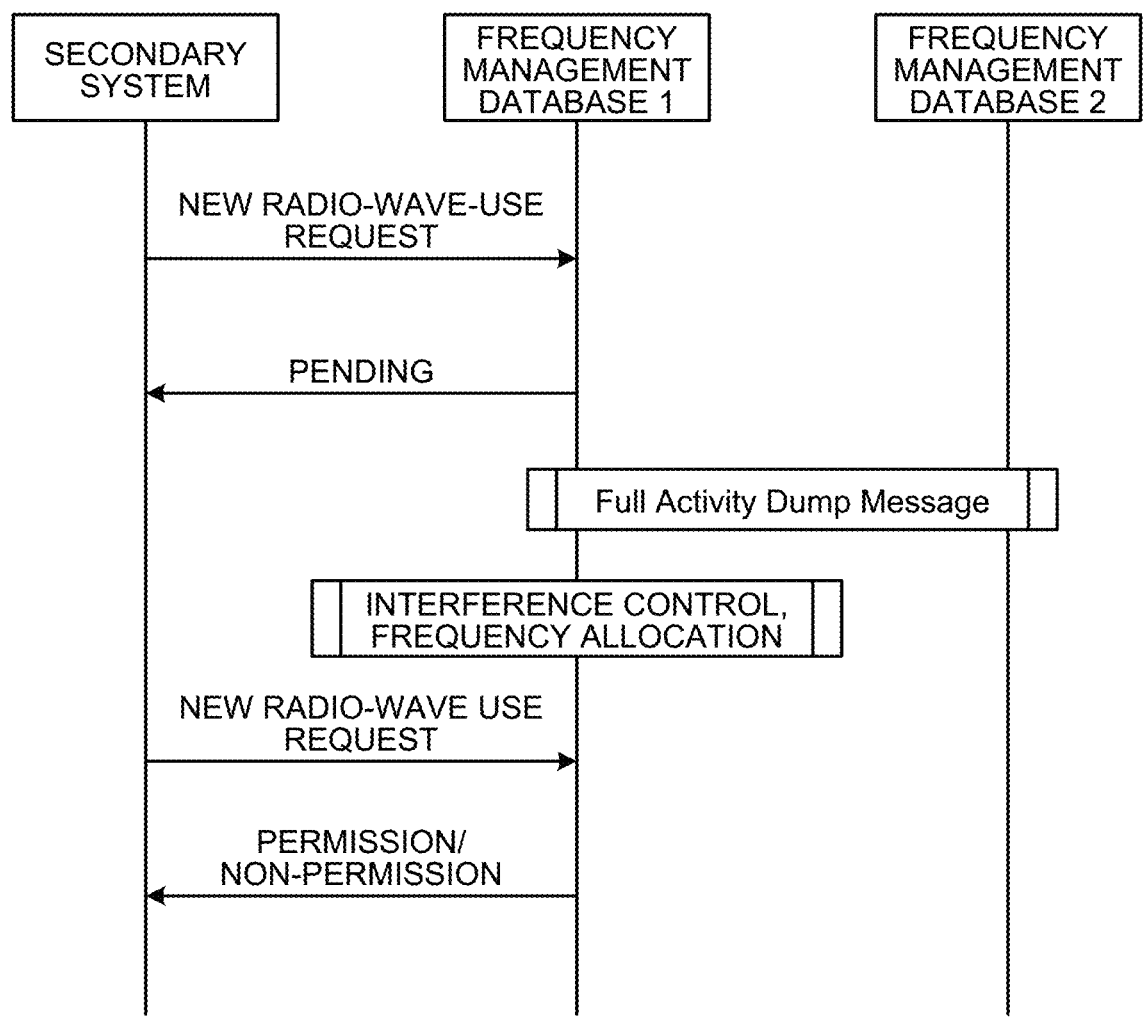
FIG. 2 is a sequence chart illustrating an operation example of SAS.

FIG. 2 is a sequence chart illustrating an operation example of SAS. In a case where a secondary system requests to start a new operation during a daytime, it is assumed that the database needs to determine whether to put the operation of the secondary system on hold or to immediately give an operation permission. However, no such determination criterion has been disclosed heretofore.

In the embodiment, the communication control apparatus periodically determines the operation parameter related to radio transmission for each of a single or a plurality of secondary systems that perform radio communication by utilizing the radio wave of the frequency band used by a single or a plurality of primary systems. Furthermore, upon receiving a radio-wave use request from a new secondary system between the determination periods of the operation parameter (between determination processing and determination processing), the communication control apparatus determines whether or not to define the new secondary system as a system to be forcibly stopped when the primary system uses the radio wave. Then, the communication control apparatus makes a notification to the new secondary system regarding a radio-wave use permission before the next determination period of the operation operator.

Thereby, the new secondary system can immediately start the use of the radio wave resource without waiting for the next determination period of the operation parameter. As a result, efficient utilization of the radio frequency resource becomes possible.

Figure 3:
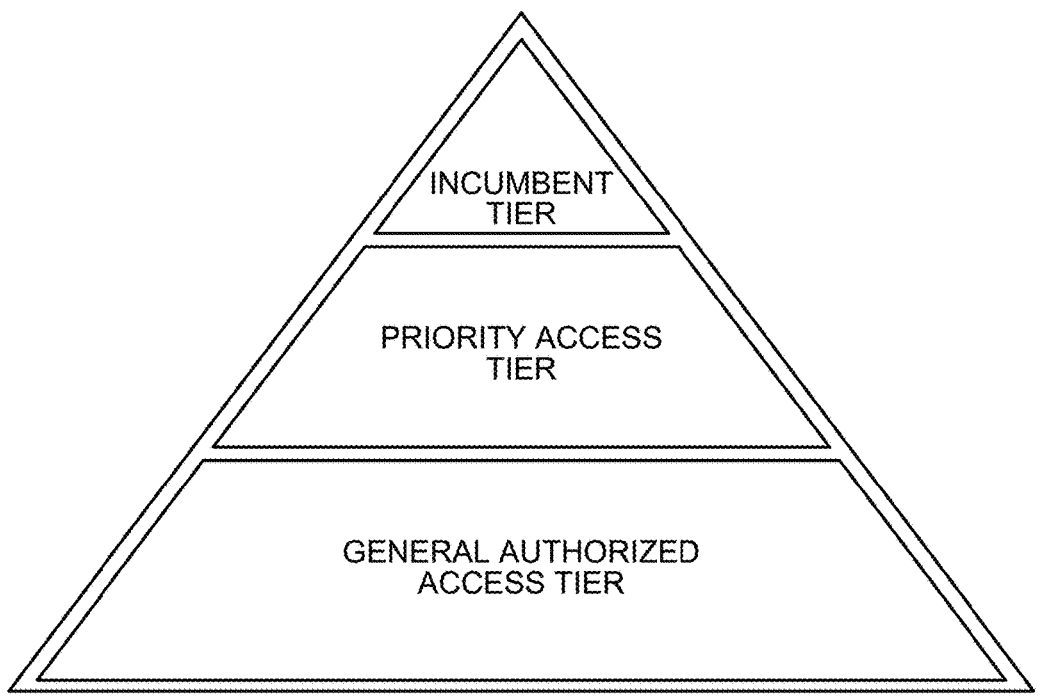
FIG. 3 is an explanatory diagram illustrating a hierarchical structure in CBRS.

In the embodiment, it is assumed that the primary system (the communication system 1) and the secondary system (the communication system 2) are under a frequency sharing environment. A case of CBRS legislated under FCC (Federal Communications Commission) of the United States will be described as an example. FIG. 3 is an explanatory diagram illustrating a hierarchical structure in CBRS. In the CBRS, a hierarchical structure configured with an incumbent tier, a priority access tier, and a general authorized access tier is defined. In this hierarchical structure, the priority access tier is positioned at a higher hierarchy of the general authorized access tier, and the incumbent tier is positioned at a higher hierarchy of the priority access tier. Referring to the CBRS as an example, the system (incumbent system) positioned at the incumbent tier is the primary system, and the systems positioned at the general authorized access tier and the priority access tier are the secondary systems.

Figure 4:
FIG. 4 is an explanatory diagram illustrating bands of CBRS.

FIG. 4 is an explanatory diagram illustrating the bands of CBRS. Referring to the CBRS described above as an example, the primary system is a military radar system, a grandfathered wireless system, or a fixed satellite service (space-to-earth). Note here that the military radar system is a shipborne radar. Furthermore, the secondary system is a wireless system called a CBSD (Citizens Broadband Radio Service Device). There are more priorities in the secondary systems, and Priority Access Licenses (PAL) capable of using shared bands with the license and General Authorized Access (GAA) equivalent to requiring no license are defined. A tier 1 illustrated in FIG. 4 corresponds to the incumbent tier illustrated in FIG. 3. Furthermore, a tier 2 illustrated in FIG. 4 corresponds to the priority access tier illustrated in FIG. 3. Furthermore, a tier 3 illustrated in FIG. 4 corresponds to the general authorized access tier illustrated in FIG. 3.

Note that the primary system (the communication system 1) of the embodiment is not limited to the example illustrated in FIG. 4. Another type of wireless system may be the primary system (the communication system 1). For example, the primary system may be a television broadcasting system such as a DVB-T (Digital Video Broadcasting-Terrestrial) system. Furthermore, the primary system may be a cellular communication system such as LTE (Long Term Evolution) or NR (New Radio). Furthermore, the primary system may be an aeronautical wireless system such as ARNS (Aeronautical Radio Navigation Service). Naturally, the primary system is not limited to the wireless systems described above but may be other types of wireless systems.

Furthermore, underutilized radio waves (White Space) used by the communication system 2 are not limited to radio waves of the Federal use band (3.55 to 3.70 GHz). The communication system 2 may use the radio waves of the frequency band different from the Federal use band (3.55 to 3.70 GHz) as the underutilized radio waves. For example, when the primary system (the communication system 1) is a television broadcasting system, the communication system 2 may be a system that uses a TV white space as the underutilized radio wave. Note here that the TV white space is a frequency band that is not utilized by the television broadcasting system among the frequency channels allocated to the television broadcasting system (the primary system). At this time, the TV white space may be a channel that is not used depending on regions.

Furthermore, the relation between the communication system 1 and the communication system 2 is not limited to the frequency sharing relation in which the communication system 1 is the primary system and the communication system 2 is the secondary system. The relation between the communication system 1 and the communication system 2 may be a network coexistence relation between the same or different wireless systems utilizing the same frequency.

Note that the term "frequency" referred in the following explanations may be replaced with other terms. For example, the term "frequency" may be replaced with terms such as "resource", "resource block", "resource element", "channel", "component carrier", "carrier", and "subcarrier", and terms having the similar meanings.

2. Configuration of Communication System

Hereinafter, the communication system 2 according to the embodiment of the present disclosure will be described. The communication system 2 is a wireless communication system that performs wireless communication by secondarily utilizing the radio waves used by the communication system (a first wireless system). For example, the communication system 2 is a wireless communication system that dynamically shares the frequency of the underutilized radio waves of the communication system 1. The communication system 2 uses a prescribed radio access technology to provide a wireless service to users or devices owned by the users.

Note here that the communication system 2 may be a cellular communication system such as W-CDMA (Wideband Code Division Multiple Access), cdma2000 (Code Division Multiple Access 2000), LTE, or NR. In the explanations below, "LTE" includes LTE-A (LTE-Advanced), LTE-A Pro (LTE-Advanced Pro), and EUTRA (Evolved Universal Terrestrial Radio Access). Furthermore, "NR" includes NRAT (New Radio Access Technology) and FEUTRA (Further EUTRA). Note that the communication system 2 is not limited to the cellular communication system. For example, the communication system 2 may be another wireless communication system such as a wireless LAN (Local Area Network) system, a television broadcasting system, an aeronautical wireless system, or a space radiocommunication system.

In the embodiment, the communication system 1 is the primary system, and the communication system 2 is the secondary system. As described above, there may be a plurality of communication systems 1 and communication systems 2. While the communication system 1 in the example of FIG. 1 is configured with a single communication device (the communication device $10_1$ illustrated in FIG. 1), the communication system 1 may be configured with a plurality of communication devices 10. The configuration of the communication device 10 may be the same as the configuration of the communication device 20 or a terminal device 30 to be described later.

2-1. Overall Configuration of Communication System

Figure 5:
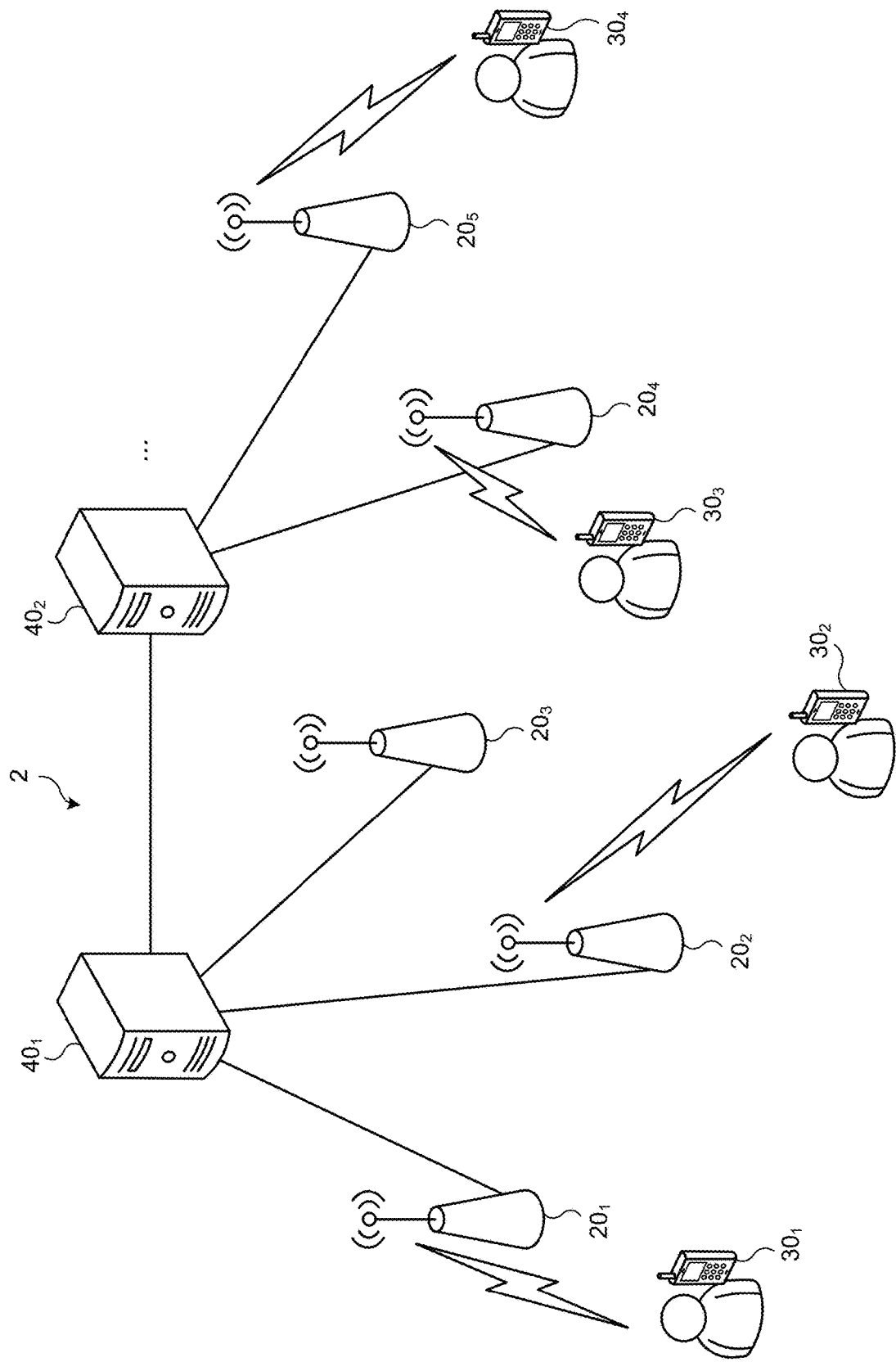
FIG. 5 is a diagram illustrating an example of a configuration of a communication system according to an embodiment of the present disclosure.

FIG. 5 is a diagram illustrating an example of the configuration of the communication system 2 according to the embodiment of the present disclosure. The communication system 2 includes the communication devices 20, the terminal devices 30, and the communication control apparatuses 40. The communication system 2 provides a wireless service to users or the devices owned by the users through cooperative operations of the wireless communication devices configuring the communication system 2. The wireless communication device is a device having a function of wireless communication, and the communication devices 20 and the terminal devices 30 correspond thereto in the example of FIG. 5. Note that the communication control apparatus 40 may have a wireless communication function. In that case, the communication control apparatus 40 can also be considered as a wireless communication device. In the explanations below, the wireless communication device may simply be referred to as a communication device.

The communication system 2 may include a plurality of communication devices 20, terminal devices 30, and communication control apparatuses 40, respectively. In the example of FIG. 5, the communication system 1 includes communication devices $20_1$, $20_2$, $20_3$, $20_4$, $20_5$, and the like as the communication devices 20. Furthermore, the communication system 2 includes terminal devices $30_1$, $30_2$, $30_3$, $30_4$, and the like as the terminal devices 30. Furthermore, the communication system 1 includes communication control apparatuses $40_1$, $40_2$, and the like as the communication control apparatuses 40.

In the explanations below, the communication device (the wireless communication device) may also be called a wireless system. For example, each of the communication device 10 and the communication devices $20_1$ to $20_5$ is a single wireless system. Furthermore, each of the terminal devices $30_1$ to $30_4$ is a single wireless system. Note that the wireless system may also be a single system configured with a plurality of wireless communication devices. For example, a system configured with a single or a plurality of communication devices 20 and a single or a plurality of subordinate terminal devices 30 thereof may be considered as a single wireless system. It is also possible to consider the communication system 1 or the communication system 2 as a single wireless system. In the explanations below, a communication system configured with a plurality of wireless communication devices may be referred to as a wireless communication system or simply as a communication system.

The communication device 20 (a second wireless system) is a wireless communication device that performs wireless communication with the terminal device 30 or with another communication device 20. For example, the communication device 20 is a base station (also referred to as a base station device) of a wireless communication system. The radio access technology used by the communication device 20 may be a cellular communication technology or a wireless LAN technology. Naturally, the radio access technology used by the communication device 20 is not limited to those but may be other radio access technologies.

The coverage of the communication device 20 may be as large as a microcell or may be as small as a picocell. Naturally, the coverage of the communication device 20 may also be as extremely small as a femtocell. Furthermore, when the communication device 20 is capable of beamforming, the cell and the service area may be formed by each beam.

The communication device 20 may be installed and operated by a single business operator or may be installed and operated by an individual. Naturally, the principal operator of the installation and operation of the communication device 20 is not limited to those. For example, the communication device 20 may be installed and operated by a plurality of business operators or a plurality of individuals in cooperation. Furthermore, the communication device 20 may be common equipment used by a plurality of business operators or a plurality of individuals. In that case, installation and operation of the equipment may be performed by a third party different from the users.

Note that the concept of the base station includes an access point and a wireless relay station (also referred to as a relay device). Furthermore, the concept of the base station includes not only a structure having a function of a base station but also a device placed at a structure. Examples of the structure may be buildings such as an office building, a house, a steel tower, station facilities, airport facilities, port facilities, and a stadium. Note that the concept of the structure includes not only buildings but also non-building structures such as a tunnel, a bridge, a dam, a fence, and an iron pole, as well as equipment such as a crane, a gate, and a windmill. Furthermore, the concept of the structure includes not only the structure on the ground (land) or in the ground but also structures on the water such as a pier and a mega-float, as well as structures in the water such as ocean observation facilities.

Furthermore, the base station may be a base station (a mobile station) configured to be movable. In this case, the base station (the mobile station) may be a wireless communication device installed in a mobile body or may be a mobile body itself. Furthermore, the mobile body may be a mobile body (for example, a vehicle such as an automobile, a bus, a truck, a train, or a linear motor car) that moves on the ground (land) or may be a mobile body (for example, a subway) that moves underground (for example, in a tunnel). Naturally, the mobile body may be a mobile terminal such as a smartphone. Furthermore, the mobile body may be a mobile body (for example, a ship such as a passenger ship, a cargo ship, or a hovercraft) that moves on the water or may be a mobile body (for example, a submersible vessel such as a submersible, a submarine, and an unmanned submersible) that moves in the water. Furthermore, the mobile body may be a mobile body (for example, an aircraft such as an airplane, an airship, or a drone) that moves inside the atmosphere or may be a space mobile body (for example, an artificial celestial body such as an artificial satellite, a spaceship, a space station, or a probe) that moves outside the atmosphere.

The terminal device 30 is a communication device having a communication function. The terminal device 30 is a user terminal such as a mobile phone, a smart device (a smartphone or a tablet), a wearable terminal, a PDA (Personal Digital Assistant), or a personal computer, for example. Furthermore, the terminal device 30 may be a device other than a user terminal, such as a machine in a factory, or a sensor placed at a building. For example, the terminal device 30 may be an M2M (Machine to Machine) device or an IoT (Internet of Things) device. Furthermore, the terminal device 30 may be a device including a relay communication function that is represented by D2D (Device to Device). Furthermore, the terminal device 30 may be a device referred to as CPE (Client Premises Equipment) used in a wireless backhaul or the like. Furthermore, the terminal device 30 may be a wireless communication device installed in a mobile body or may be a mobile body itself.

The communication control apparatus 40 is an apparatus that controls wireless communication of the communication device 20. For example, the communication control apparatus 40 is an apparatus that determines an operation parameter used by the communication device 20 and gives an instruction to the communication device 20. At this time, the communication control apparatus 40 may be a network manager that performs integral control of wireless devices within a network. In an example based on ETSI EN 303 387 or IEEE 802.19.1-2014, the communication control apparatus 40 may be a control apparatus such as Spectrum Manager/Coexistence Manager that performs radio interference control among the wireless devices. Furthermore, under a frequency sharing environment, a database (a database server, apparatus, system) such as GLDB (Geolocation Database) or SAS (Spectrum Access System) can also be the communication control apparatus 40.

Note that there may be a plurality of communication control apparatuses 40 in a single communication system 2. In that case, the communication control apparatuses 40 exchange mutually managed information on the communication devices 20, and perform allocation of the required frequency as well as calculation of interference control.

While the control target of the communication control apparatuses 40 is basically the communication devices 20, the communication control apparatuses 40 may also control the subordinate terminal devices 30 thereof.

Hereinafter, the configuration of each of the devices configuring the communication system 2 will be described in a specific manner.

2-2. Configuration of Communication Device

Figure 6:
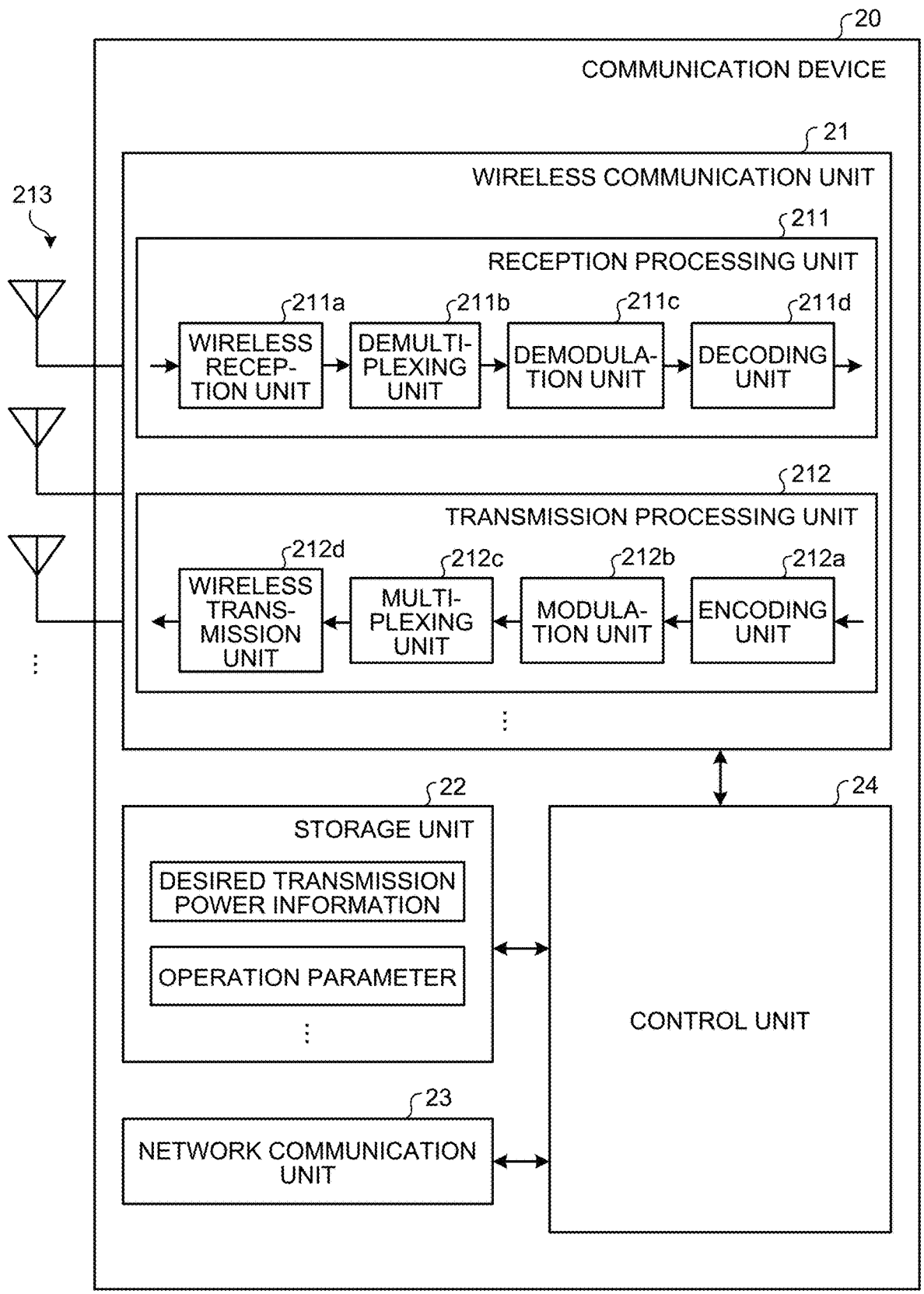
FIG. 6 is a diagram illustrating an example of a configuration of a communication device according to the embodiment of the present disclosure.

First, the configuration of the communication device 20 will be described. FIG. 6 is a diagram illustrating an example of the configuration of the communication device 20 according to the embodiment of the present disclosure. The communication device 20 is a wireless communication device (a wireless system) that performs wireless communication with the terminal device 30 under control of the communication control apparatus 40. For example, the communication device 20 is a base station device (a ground station device) located on the ground. At this time, the communication device 20 may be a base station device placed in a structure on the ground or may be a base station device installed in a mobile body that moves on the ground. More specifically, the communication device 20 may be an antenna placed at a structure such as a building or may be a signal processing device connected to the antenna. Naturally, the communication device 20 may be the structure itself or the mobile body itself. Note that "on the ground" means not only on the ground (land) but also on the ground in a broad sense including underground, on the water, and in the water.

Note that the communication device 20 is not limited to a ground station device. For example, the communication device 20 may be a base station device (a non-ground station) that moves or floats in the air or the space. At this time, the communication device 20 may be an aircraft station device or a satellite station device.

The aircraft station device may be a device loaded on an aircraft or the like or may be an aircraft itself. The concept of the aircraft includes not only heavier-than-air aircrafts such as an airplane and a glider but also lighter-than-air aircrafts such as a balloon and an airship. Furthermore, the concept of the aircraft also includes rotorcrafts such as a helicopter and an autogiro. Note that the aircraft station device (or the aircraft on which the aircraft station device is loaded) may be a manned aircraft or may be an unmanned aircraft such as a drone.

The satellite station device may be a device loaded on a space mobile body such as an artificial satellite or may be the space mobile body itself. The satellite to be the satellite station device may be any one of a Low Earth Orbiting (LEO) satellite, a Medium Earth Orbiting (MEO) satellite, a Geostationary Earth Orbiting (GEO) satellite, and a Highly Elliptical Orbiting (HEO) satellite. Naturally, the satellite station device may be a device loaded on the low earth orbiting satellite, the medium earth orbiting satellite, the geostationary earth orbiting satellite, or the highly elliptical orbiting satellite.

Furthermore, the communication device 20 may be a relay station device. The relay station device may be an aeronautical station or an earth station, for example. The relay station device may be considered as a kind of relay devices described above. The aeronautical station is a wireless station placed on the ground or in the mobile body that moves on the ground in order to communicate with the aircraft station device. Furthermore, the earth station is a wireless station located on the earth (including the air) in order to communicate with the satellite station device. The earth station may be a large-scale earth station or may be a small-scale earth station such as VSAT (Very Small Aperture Terminal). Note that the earth station may be a VSAT control earth station (also referred to as a master station or a HUB station) or may be a VSAT earth station (also referred to as a slave station). Furthermore, the earth station may be a wireless station installed in a mobile body that moves on the ground. For example, as the earth station loaded on a ship, there is an Earth Stations on board Vessels (ESV). Furthermore, the earth station may include an aircraft earth station that is placed in an aircraft (including a helicopter) and communicates with the satellite station. Furthermore, the earth station may include an aeronautical earth station that is placed in a mobile body that moves on the ground and communicates with the aircraft earth station via the satellite station. Note that the relay station device may be a portable and mobile wireless station that communicates with the satellite station and the aircraft station.

The communication device 20 includes a wireless communication unit 21, a storage unit 22, a network communication unit 23, and a control unit 24. Note that the configuration illustrated in FIG. 6 is a functional configuration, and the hardware configuration may be different from that. Furthermore, functions of the communication device 20 may be distributed and mounted on a plurality of physically separate apparatuses.

The wireless communication unit 21 is a wireless communication interface that performs wireless communication with other communication devices (for example, the terminal device 30, the communication control apparatus 40, and another communication device 20). The wireless communication unit 21 operates under control of the control unit 24. The wireless communication unit 21 may support a plurality of radio access modes. For example, the wireless communication unit 21 may support both NR and LTE. The wireless communication unit 21 may support other cellular communication modes such as W-CDMA and cdma2000. Furthermore, the wireless communication unit 21 may support a wireless LAN communication mode in addition to the cellular communication mode. Needless to say, the wireless communication unit 21 may only support a single radio access mode.

The wireless communication unit 21 includes a reception processing unit 211, a transmission processing unit 212, and an antenna 213. The wireless communication unit 21 may include a plurality of reception processing units 211, transmission processing units 212, and antennas 213. When the wireless communication unit 21 supports a plurality of radio access modes, each unit of the wireless communication unit 21 may be configured individually for each of the radio access modes. For example, if the communication device 20 supports NR and LTE, the reception processing unit 211 and the transmission processing unit 212 may be configured individually for NR and LTE.

The reception processing unit 211 performs processing of uplink signals received via the antenna 213. The reception processing unit 211 includes a wireless reception unit 211a, a demultiplexing unit 211b, a demodulation unit 211c, and a decoding unit 211d.

The wireless reception unit 211a performs, for the uplink signals, down-converting, removal of unnecessary frequency components, control of amplification level, quadrature demodulation, conversion to digital signals, removal of guard intervals, extraction of frequency domain signals by fast Fourier transformation, and the like. For example, it is assumed that the radio access mode of the communication device 20 is a cellular communication mode such as LTE. In that case, the demultiplexing unit 211b separates uplink channels such as PUSCH (Physical Uplink Shared Channel), PUCCH (Physical Uplink Control Channel), and uplink reference signals from signals output from the wireless reception unit 211a. The demodulation unit 211c performs demodulation of reception signals by using a modulation method such as BPSK (Binary Phase Shift Keying) or QPSK (Quadrature Phase Shift Keying) for modulation symbols of the uplink channel. The modulation method used by the demodulation unit 211c may be 16QAM (Quadrature Amplitude Modulation), 64QAM, or 256QAM. The decoding unit 211d performs decoding processing for the demodulated encoded bits of the uplink channel. The decoded uplink data and uplink control information are output to the control unit 24.

The transmission processing unit 212 performs transmission processing of downlink control information and downlink data. The transmission processing unit 212 includes an encoding unit 212a, a modulation unit 212b, a multiplexing unit 212c, and a wireless transmission unit 212d.

The encoding unit 212a performs encoding of the downlink control information and the downlink data input from the control unit 24 by using an encoding method such as block encoding, convolutional encoding, or turbo encoding. The modulation unit 212b modulates the encoded bits output from the encoding unit 212a with a prescribed modulation method such as BPSK, QPSK, 16QAM, 64QAM, or 256QAM. The multiplexing unit 212c multiplexes modulation symbols and downlink reference signals of each channel and places the resultant signal in a prescribed resource element. The wireless transmission unit 212d performs various kinds of signal processing for the signals from the multiplexing unit 212c. For example, the wireless transmission unit 212d performs processing such as conversion to time domains by a fast Fourier transform, adding guard intervals, generation of digital signals of a base band, conversion to analog signals, quadrature demodulation, up-converting, removal of unnecessary frequency components, and amplification of power. The signals generated by the transmission processing unit 212 are transmitted from the antenna 213.

The storage unit 22 is a data readable and writable storage device such as a DRAM, a SRAM, a flash memory, or a hard disk. The storage unit 22 functions as a storage means of the communication device 20. The storage unit 22 stores therein desired transmission power information, operation parameters, and the like. The desired transmission power information is the information on the transmission power the communication device 20 requests to the communication control apparatus 40, as the information on the transmission power required for transmitting radio waves. The operation parameter is the information regarding the radio transmission operations (for example, setting information) of the communication device 20. For example, the operation parameter is the information on the maximum value of the transmission power (the maximum acceptable transmission power) acceptable to the communication device 20. Naturally, the operation parameter is not limited to the information on the maximum acceptable transmission power.

The network communication unit 23 is a communication interface for communicating with other devices. For example, the network communication unit 23 is a LAN (Local Area Network) interface such as (Network Interface Card). The network communication unit 23 may be a USB (Universal Serial Bus) interface configured with a USB host controller, a USB port, and the like. Furthermore, the network communication unit 23 may be a wired interface or a wireless interface. The network communication unit 23 functions as network communication means of the communication device 20. The network communication unit 23 communicates with other devices under control of the control unit 24.

The control unit 24 is a controller that controls each unit of the communication device 20. The control unit 24 is implemented by a processor such as a CPU (Central Processing Unit) or an MPU (Micro Processing Unit). For example, the processor implements the control unit 24 by executing various kinds of computer programs on a RAM (Random Access Memory) or the like as a working area, the computer programs being stored in the storage device inside the communication device 20. Note that the control unit 24 may be implemented by an integrated circuit such as an ASIC (Application Specific Integrated Circuit) or an FPGA (Field Programmable Gate Array). The CPU, the MPU, the ASIC, and the FPGA can all be considered as controllers.

2-3. Configuration of Terminal Device

Figure 7:
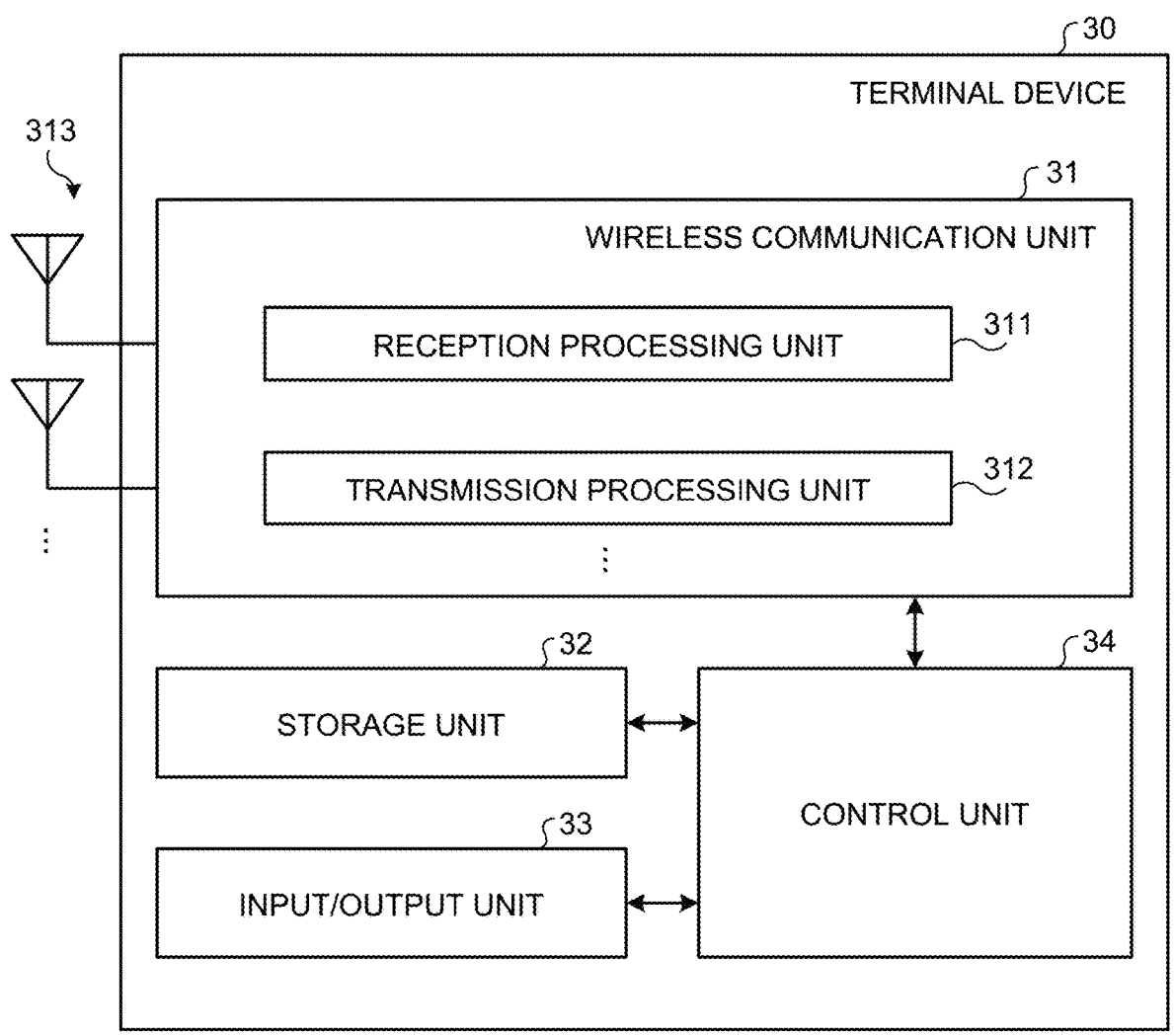
FIG. 7 is a diagram illustrating an example of a configuration of a terminal device according to the embodiment of the present disclosure.

Next, the configuration of the terminal device 30 will be described. FIG. 7 is a diagram illustrating an example of the configuration of the terminal device 30 according to the embodiment of the present disclosure. The terminal device 30 is a communication device that performs wireless communication with the communication device 20 and the communication control apparatus 40. In the embodiment, the concept of the communication device (the wireless communication device) includes not only the base station device but also the terminal device. The communication device can also be referred to as a wireless system.

The terminal device 30 includes a wireless communication unit 31, a storage unit 32, an input/output unit 33, and a control unit 34. Note that the configuration illustrated in FIG. 7 is the functional configuration, and a hardware configuration may be different from that. Furthermore, functions of the terminal device 30 may be distributed and mounted on a plurality of physically separated structures.

The wireless communication unit 31 is a wireless communication interface that performs wireless communication with other communication devices (for example, the communication device 20 and another terminal device 30). The wireless communication unit 31 operates under control of the control unit 34. The wireless communication unit 31 supports a single or a plurality of radio access modes. For example, the wireless communication unit 31 supports both NR and LTE. The wireless communication unit 31 may support other radio access modes such as W-CDMA and cdma2000.

The wireless communication unit 31 includes a reception processing unit 311, a transmission processing unit 312, and an antenna 313. The wireless communication unit 31 may include a plurality of reception processing units 311, transmission processing units 312, and antennas 313. When the wireless communication unit 31 supports a plurality of radio access modes, each unit of the wireless communication unit 31 is individually configured for each of the radio access modes. For example, the reception processing unit 311 and the transmission processing unit 312 may be configured individually for LTE and NR. The configurations of the reception processing unit 311 and the transmission processing unit 312 are the same as those of the reception processing unit 211 and the transmission processing unit 212 of the communication device 20.

The storage unit 32 is a data readable and writable storage device such as a DRAM, a SRAM, a flash memory, or a hard disk. The storage unit 32 functions as storage means of the terminal device 30.

The input/output unit 33 is a user interface for exchanging information with the user. For example, the input/output unit 33 is an operation device for the user to perform various kinds of operations, such as a keyboard, a mouse, operation keys, or a touch panel. Alternatively, the input/output unit 33 is a display device such as a liquid crystal display or an organic electroluminescence display. The input/output unit 33 may be an acoustic device such as a speaker or a buzzer. Furthermore, the input/output unit 33 may be a lighting device such as an LED (Light-Emitting Diode) lamp. The input/output unit 33 functions as input/output means (input means, output means, operation means, or notification means) of the terminal device 30.

The control unit 34 is a controller that controls each unit of the terminal device 30. The control unit 34 is implemented by a processor such as a CPU or an MPU. For example, the processor implements the control unit 34 by executing various kinds of computer programs on a RAM or the like as a working area, the computer programs being stored in the storage device inside the terminal device 30. Note that the control unit 34 may be implemented by an integrated circuit such as an ASIC or an FPGA. The CPU, the MPU, the ASIC, and the FPGA can all be considered as controllers.

2-4. Configuration of Communication Control Apparatus

The communication control apparatus 40 is an apparatus that controls wireless communication of the communication device 20. The communication control apparatus 40 may control wireless communication of the terminal device 30 via the communication device 20 or directly. The communication control apparatus 40 is a network manager that performs integral control of the wireless devices within a network, for example. For example, the communication control apparatus 40 is a Spectrum Manager/Coexistence Manager. Furthermore, the communication control apparatus 40 may be a database server such as a GLDB (Geolocation Database) or an SAS (Spectrum Access System).

If the communication system 2 is a cellular communication system, the communication control apparatus 40 may be an apparatus that configures a core network. The core network CN is an EPC (Evolved Packet Core) or a 5GC (5G Core Network), for example. If the core network is the EPC, the communication control apparatus 40 may be an apparatus having a function as an MME (Mobility Management Entity), for example. Furthermore, if the core network is a 5GC, the communication control apparatus 40 may be an apparatus having a function as an AMF (Access and Mobility Management Function), for example. Note that even if the communication system 2 is a cellular communication system, the communication control apparatus 40 may not necessarily need to be an apparatus that configures a core network. For example, the communication control apparatus 40 may be an apparatus having a function as an RNC (Radio Network Controller).

Note that the communication control apparatus 40 may have a function of a gateway. For example, if the core network is an EPC, the communication control apparatus 40 may be an apparatus that has a function as an S-GW (Serving Gateway) or a P-GW (Packet Data Network Gateway). Furthermore, if the core network is a 5GC, the communication control apparatus 40 may be an apparatus having a function as a UPF (User Plane Function). Note that the communication control apparatus 40 may not necessarily be an apparatus that configures a core network. For example, it is assumed that the core network is a core network of W-CDMA or cdma2000. In that case, the communication control apparatus 40 may be an apparatus that functions as an RNC (Radio Network Controller).

Furthermore, the communication control apparatus 40 may be a system that controls a plurality of secondary systems. In that case, the communication system 2 can be considered as a system including a plurality of secondary systems.

Figure 8:
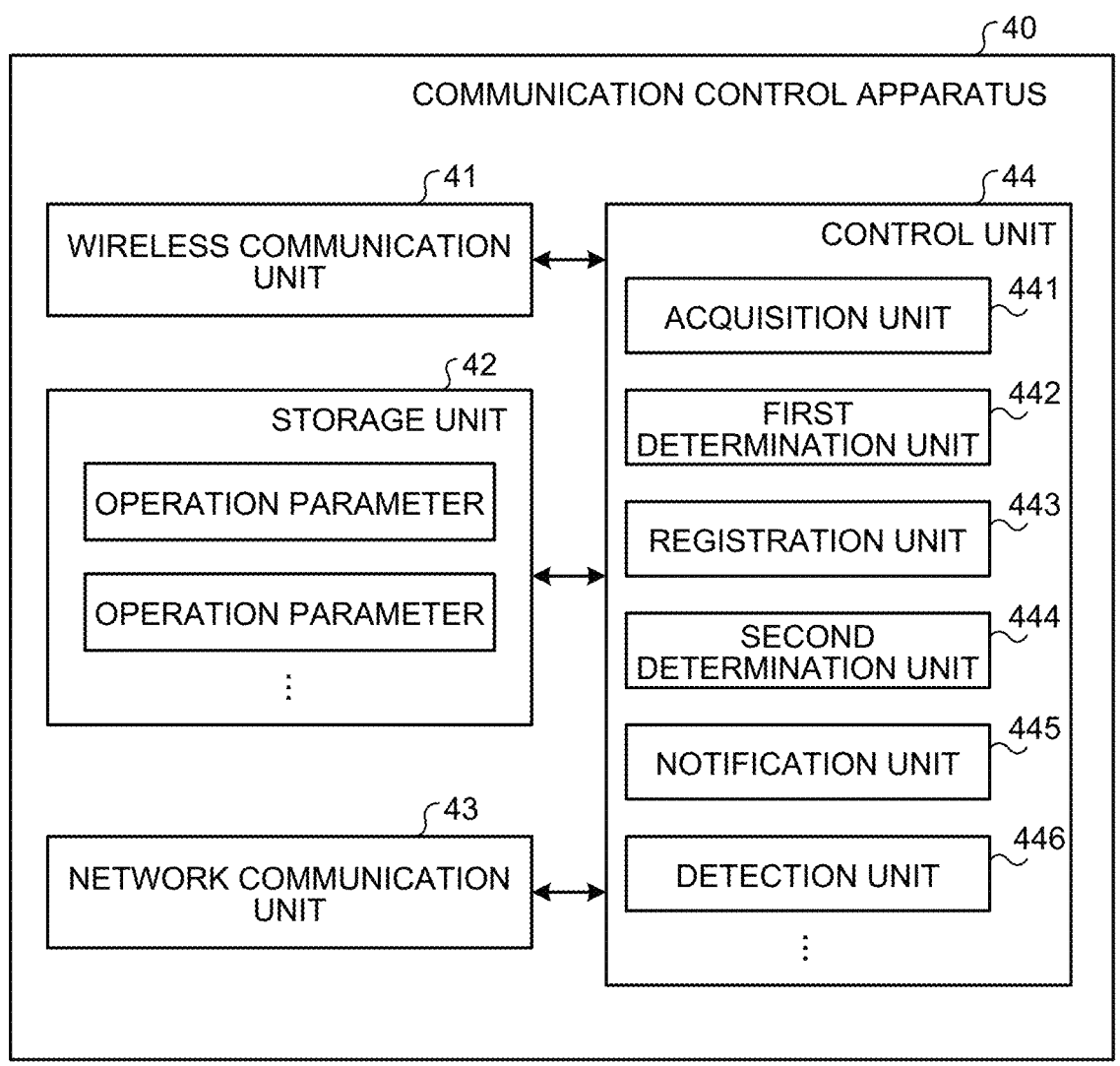
FIG. 8 is a diagram illustrating an example of a configuration of a communication control apparatus according to the embodiment of the present disclosure.

FIG. 8 is a diagram illustrating an example of the configuration of the communication control apparatus 40 according to the embodiment of the present disclosure. The communication control apparatus 40 includes a wireless communication unit 41, a storage unit 42, a network communication unit 43, and a control unit 44. Note that the configuration illustrated in FIG. 8 is the functional configuration, and a hardware configuration may be different from that. Furthermore, functions of the communication control apparatus 40 may be distributed and mounted on a plurality of physically separated structures. For example, the communication control apparatus 40 may be configured with a plurality of server devices.

The wireless communication unit 41 is a wireless communication interface that performs wireless communication with other communication devices (for example, the communication device 20, the terminal device 30, and another communication control apparatus 40). The wireless communication unit 41 operates under control of the control unit 44. The wireless communication unit 31 supports a single or a plurality of radio access modes. For example, the wireless communication unit 31 supports both NR and LTE. The wireless communication unit 31 may support other radio access modes such as W-CDMA and cdma2000. The configuration of the wireless communication unit 41 is the same as that of the wireless communication unit 21 of the communication device 20.

The storage unit 42 is a data readable and writable storage device such as a DRAM, a SRAM, a flash memory, or a hard disk. The storage unit 22 functions as storage means of the communication device 20. The storage unit 22 stores therein operation parameters of each of the communication devices 20 that configure the communication system 2.

The network communication unit 43 is a communication interface for communicating with other devices. The network communication unit 43 may be a network interface or may be a device-connection interface. For example, the network communication unit 43 may be a LAN (Local Area Network) interface such as a NIC (Network Interface Card). Furthermore, the network communication unit 43 may be a USB (Universal Serial Bus) interface configured with a USB host controller, a USB port, and the like. Furthermore, the network communication unit 43 may be a wired interface or a wireless interface. The network communication unit 43 functions as communication means of the communication control apparatus 40. The network communication unit 43 communicates with the communication device 20 and the terminal device 30 under control of the control unit 44.

The control unit 44 is a controller that controls each unit of the communication control apparatus 40. The control unit 44 is implemented by a processor such as a CPU or an MPU. For example, the processor implements the control unit 44 by executing various kinds of computer programs on a RAM or the like as a working area, the computer programs being stored in the storage device inside the communication control apparatus 40. Note that the control unit 44 may be implemented by an integrated circuit such as an ASIC or an FPGA. The CPU, the MPU, the ASIC, and the FPGA can all be considered as controllers.

The control unit 44 includes, as illustrated in FIG. 8, an acquisition unit 441, a first determination unit 442, a registration unit 443, a second determination unit 444, a notification unit 445, and a detection unit 446. Each of the blocks (the acquisition unit 441 to the detection unit 446) configuring the control unit 44 is a functional block indicating the respective functions of the control unit 44. Those functional blocks may be software blocks or may be hardware blocks. For example, each of the functional blocks described above may be a single software module implemented by software (including a microprogram) or may be a single circuit block on a semiconductor chip (die). Naturally, each of the functional blocks may be a single processor or a single integrated circuit. Any method may be employed for configuring the functional blocks. Note that the control unit 44 may be configured with a unit of functions different from the functional blocks described above. Operations of each of the blocks (the acquisition unit 441 to the detection unit 446) configuring the control unit 44 will be described in detail in the section of the communication control processing and the like to be described later.

3. Interference Model

Figure 9:
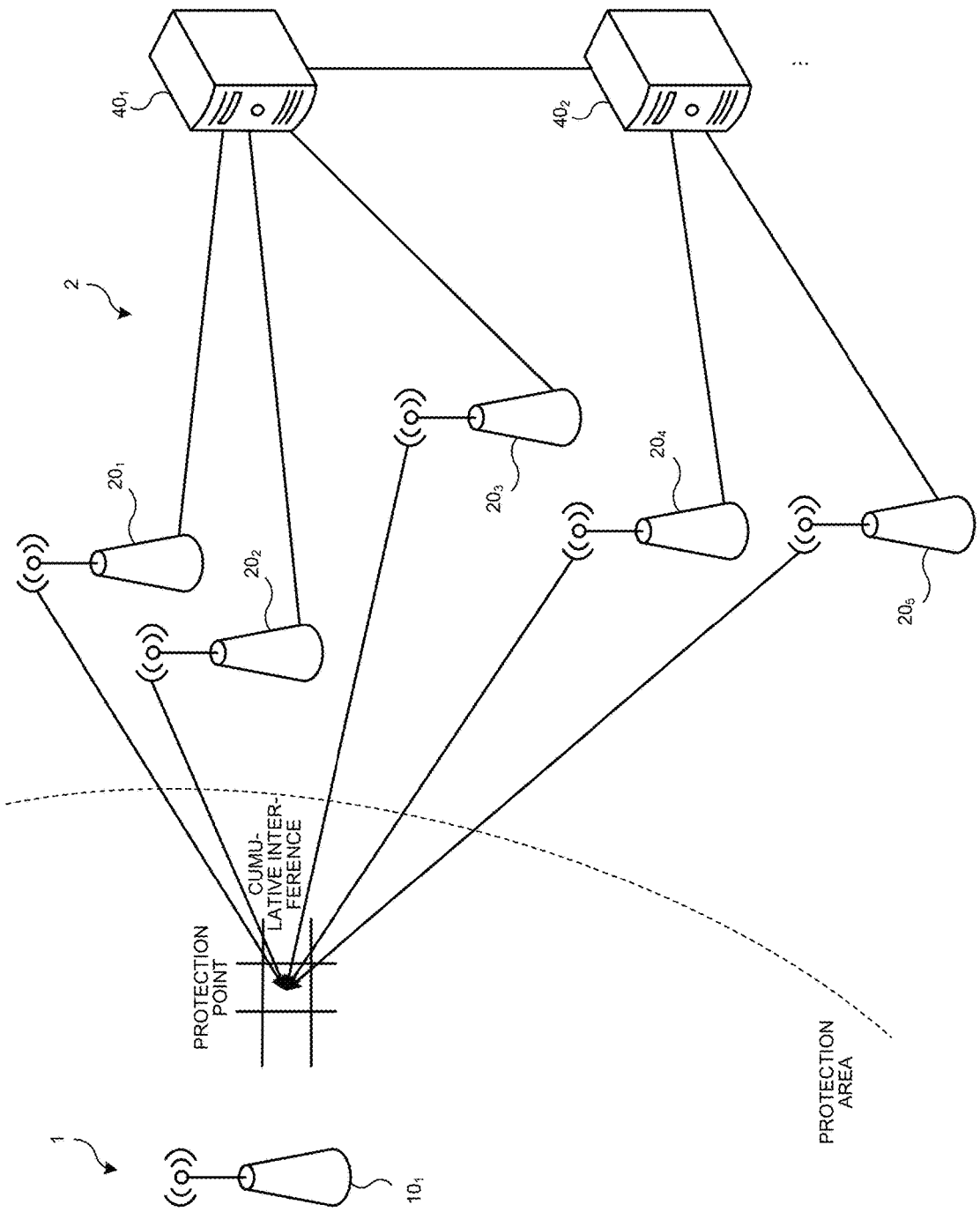
FIG. 9 is an explanatory diagram illustrating an example of an interference model assumed in the embodiment.

Next, an interference model assumed in the embodiment will be described. FIG. 9 is an explanatory diagram illustrating an example of the interference model assumed in the embodiment. The interference model illustrated in FIG. 9 is applied to a case where the primary system has a service area, for example. In the example of FIG. 9, the communication system 1 (the primary system) is a wireless communication system having a service area. This service area is the protection area of the communication system 1, for example. In the protection area, a plurality of interference calculation reference points (referred to as protection points hereinafter) are set. The protection points are set by the operator of the communication system 1 or a public organization or the like (referred to as an administrator hereinafter) that manages radio waves, for example. For example, the administrator may section the protection area in a lattice form, and have the center of a prescribed lattice as the protection point. Any method can be employed for determining the protection point. The interference margin of each of the protection points is set by the administrator or the like. FIG. 9 illustrates the interference to be given to the protection point by the communication devices 20 configuring the communication system 2 (the secondary system). The communication control apparatus 40 of the communication system 2 controls the transmission power of the communication devices 20 such that the cumulative interference at each of the protection points does not exceed the set interference margin.

Figure 10:
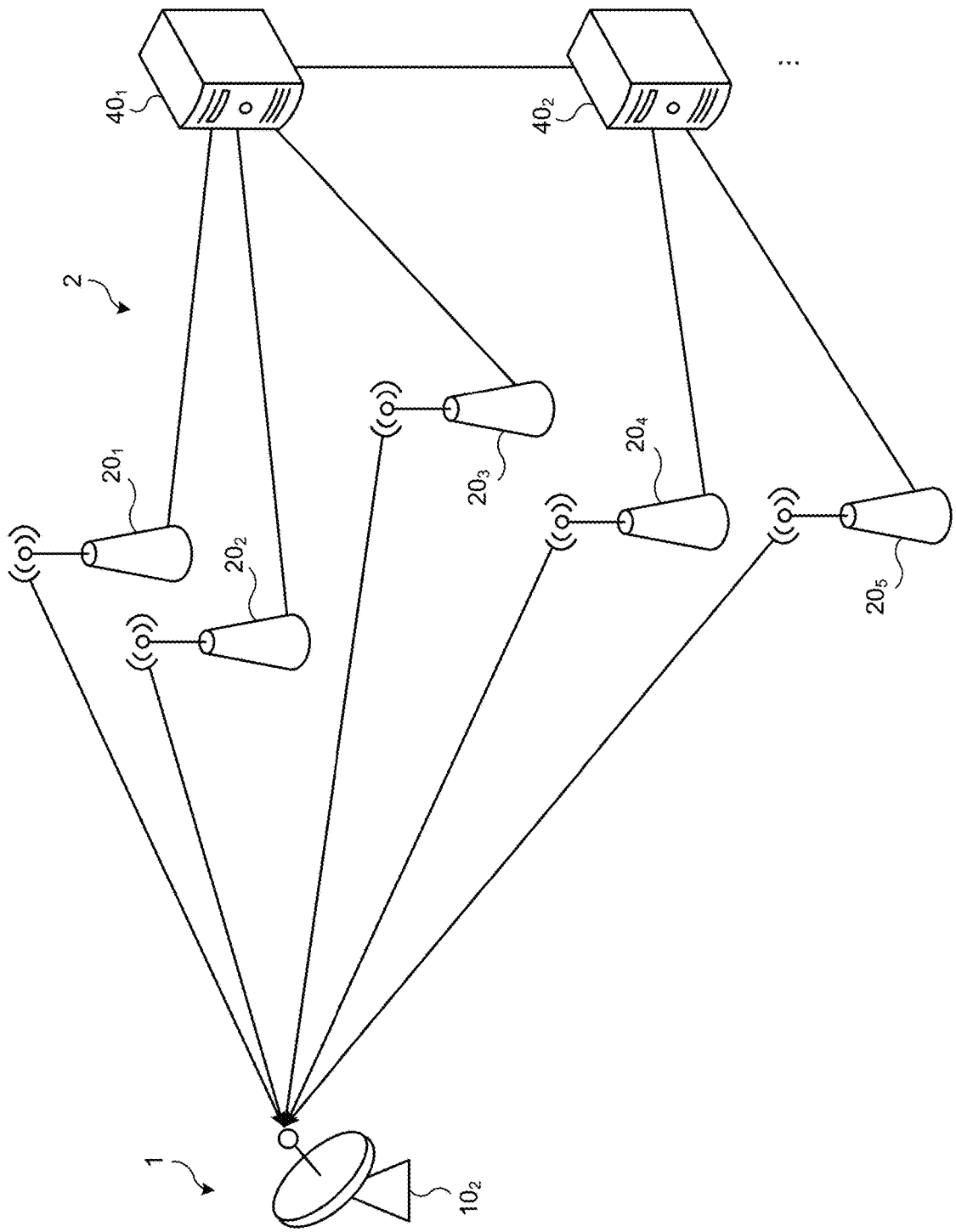
FIG. 10 is an explanatory diagram illustrating another example of the interference model assumed in the embodiment.

FIG. 10 is an explanatory diagram illustrating another example of the interference model assumed in the embodiment. The interference model illustrated in FIG. 10 is applied to a case where the primary system only performs reception, for example. In the example of FIG. 10, the communication system 1 (the primary system) includes a reception antenna as the communication device $10_2$. The communication device $10_2$ is a reception antenna of a satellite ground station, for example. The communication control apparatus 40 of the communication system 2 has the position of the reception antenna as the protection point and controls the transmission power of the communication devices 20 such that the cumulative interference at that point does not exceed the interference margin.

4. Primary System Protection Methods

Next, primary system protection methods will be described. Among the known primary system protection methods, methods associated with applied interference calculation processing can be broadly classified into the following two types.

(1) Interference margin (acceptable interference quantity) simultaneous distribution mode (2) Low-interference node preferentially permitting mode Note that examples of the primary system protection method of interference margin (acceptable interference quantity) simultaneous distribution mode may be the maximum acceptable EIRP calculation method disclosed in Non Patent Literature 3 and IAP (Interactive Allocation Process) disclosed in Non Patent Literature 2.

Furthermore, an example of the primary protection method of low-interference node preferentially permitting mode may be the Move List calculation method for DPA (Dynamic Protection Area) protection disclosed in Non Patent Literature 2.

Hereinafter, the primary system protection method (first method) of "low-interference node preferentially permitting mode" and the primary system protection method (second method) of "interference-margin simultaneous distribution mode" will be described.

4-1. Interference-Margin Simultaneous Distribution Mode

Figure 11:
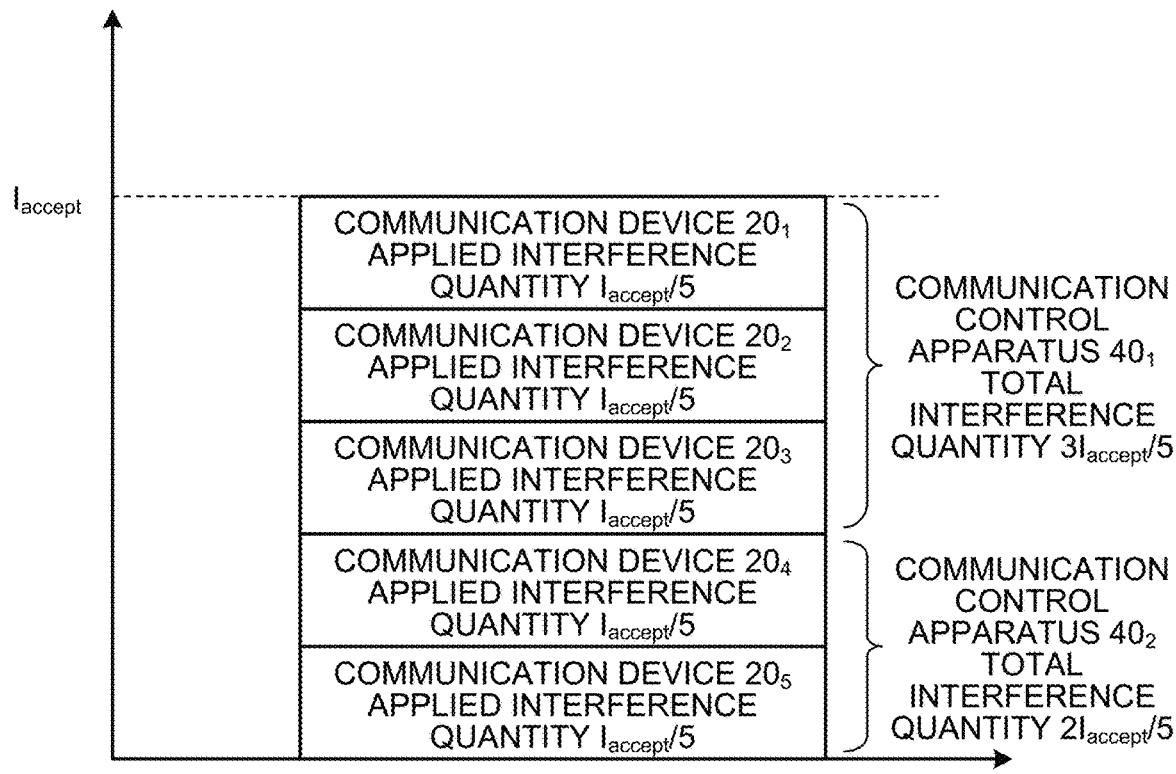
FIG. 11 is an explanatory diagram for describing a primary system protection method of interference-margin simultaneous distribution mode.

First, the primary system protection method (second method) of interference-margin simultaneous distribution mode will be described. FIG. 11 is an explanatory diagram for describing the primary system protection method of interference-margin simultaneous distribution mode. In the example of FIG. 11, the acceptable interference threshold value of the primary system is defined as $I_{accept}$. This threshold value may be an actual threshold value or may be a value set with some margin (for example, a protection ratio) given to the actual value by considering a calculation error and an interference fluctuation.

In the primary system protection method of interference-margin simultaneous distribution mode, interference control means to determine the transmission power (EIRP, Conducted Power+Antenna gain, and the like) of the wireless device so as not to exceed the acceptable interference threshold value. At this time, if there is a great number of communication devices 20 and each thereof is determined not to exceed the acceptable interference threshold value, the interference power received in the communication system 1 (the primary system) may exceed the acceptable interference threshold value. Therefore, the interference margin (acceptable interference quantity) is "distributed" according to the number of communication devices 20 registered with the communication control apparatus 40.

For example, in the example of FIG. 11, there are five communication devices 20 in total. Therefore, the acceptable interference quantity of $I_{accept}/5$ is distributed to each device. The communication devices 20 cannot recognize the distribution quantity by themselves, so that they recognize it via the communication control apparatus or acquire the transmission power determined based on the distribution quantity. The communication control apparatus cannot recognize the number of wireless devices managed by other communication control apparatuses so that, by mutually exchanging information, it becomes possible to recognize the total number and to distribute the acceptable interference quantity. For example, in the communication control apparatus $40_1$, the acceptable interference quantity of $3I_{accept}/5$ is allocated.

In this method, the interference margin is distributed to the communication device 20 that is in operation or about to start an operation anew at the point of calculation. Therefore, when the calculation is performed periodically, there is no remainder (residual) of interference margin existing therebetween in terms of calculation. Thus, by reserving the interference margin in advance, the interference margin can be distributed to a new secondary system in the range outside the calculation time.

Figure 12:
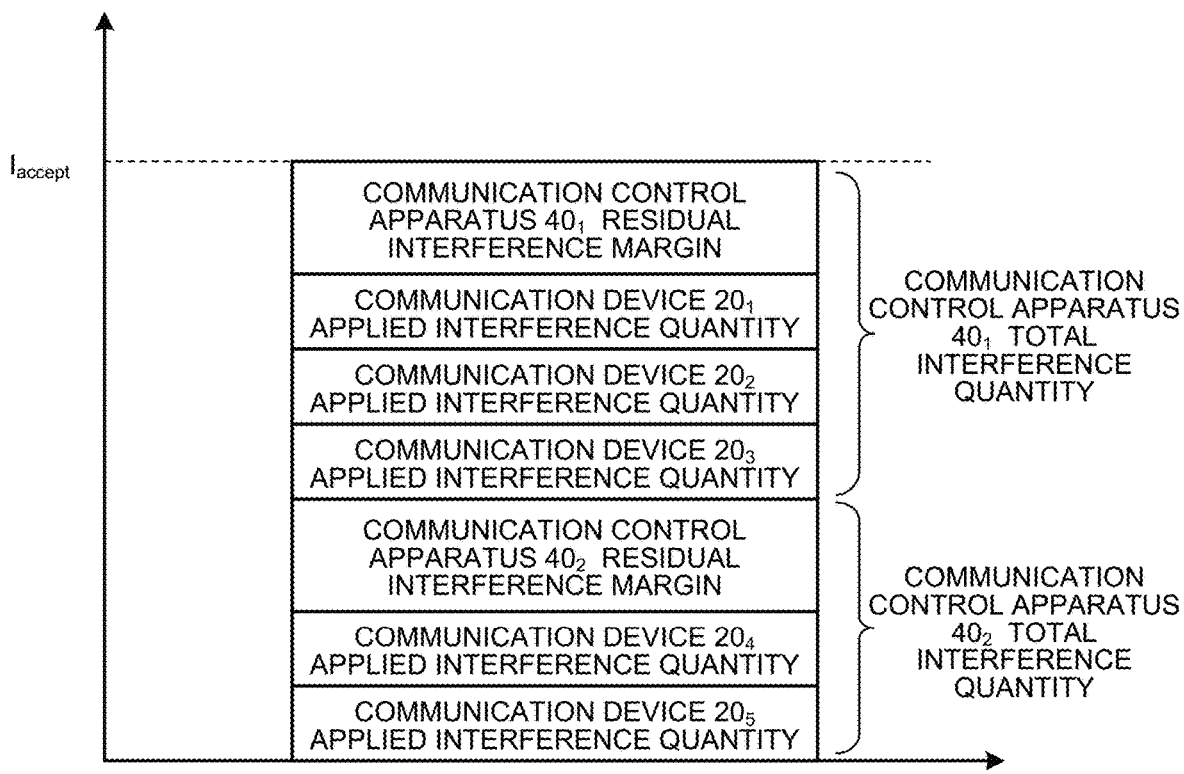
FIG. 12 is a diagram illustrating a state where interference margins are reserved in advance.

FIG. 12 is a diagram illustrating a state where the interference margins are reserved in advance. FIG. 12 indicates the total interference quantity set for each of the two communication control apparatuses 40 (the communication control apparatuses $40_1$ and $40_2$). Furthermore, FIG. 12 indicates the interference quantity (applied interference quantity) given to a prescribed protection point of the communication system 1 by the communication devices 20 (the communication devices $20_1$ to $20_5$) under control of the two communication control apparatuses 40. The interference quantity acquired by subtracting the interference quantities of the communication devices 20 from the total interference quantity of each of the two communication control apparatuses 40 is the reserved interference margin. In the explanations below, the reserved or remaining interference quantity is referred to as the residual interference margin. The residual interference margin can also be referred to as the residual interference quantity.

4-2. Low-Interference Node Preferentially Permitting Mode

Figure 13:
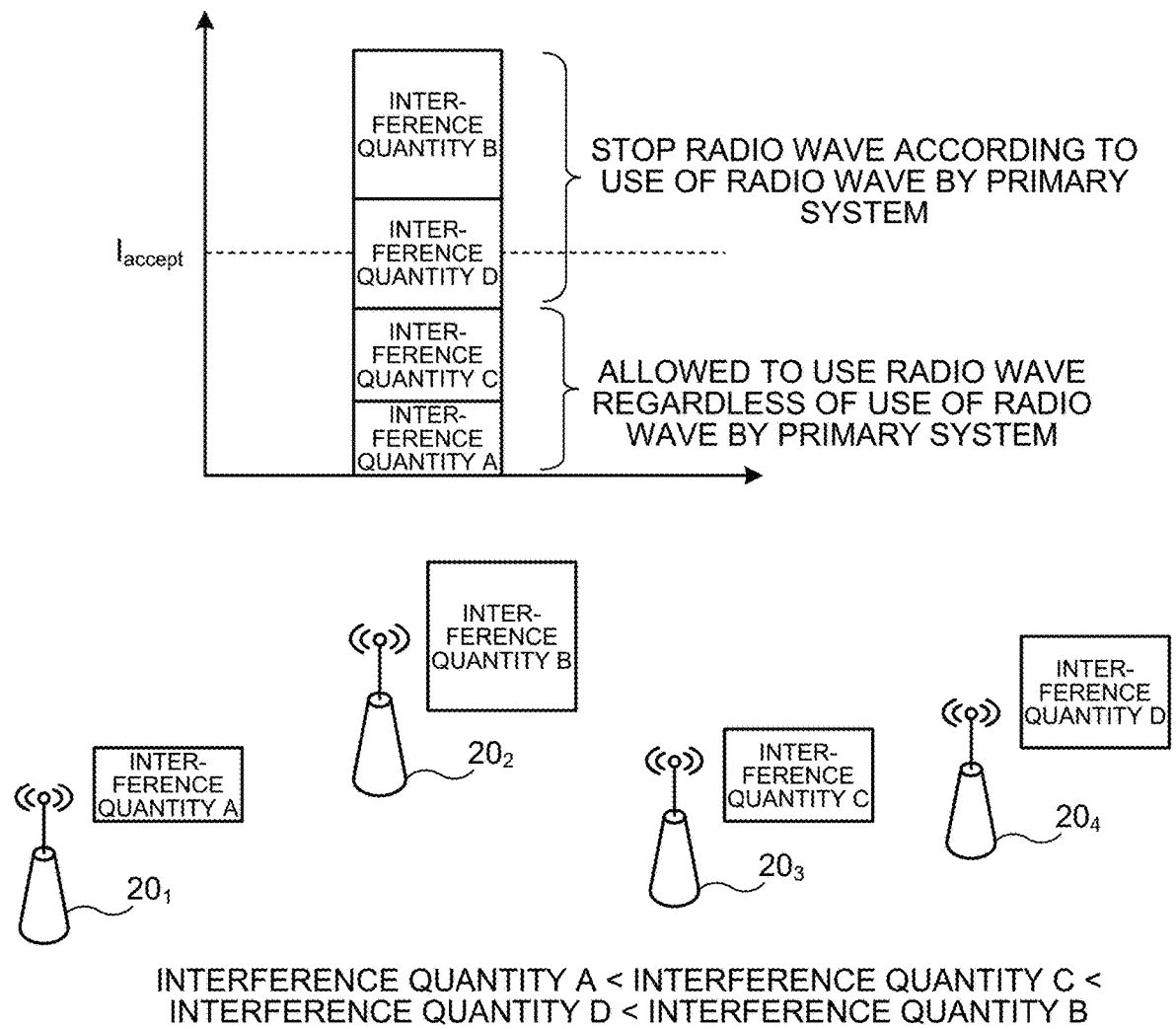
FIG. 13 is an explanatory diagram for describing a primary system protection method of low-interference node preferentially permitting mode.

First, the primary system protection method (first method) of low-interference node preferentially permitting mode will be described. FIG. 13 is an explanatory diagram for describing the primary system protection method of low-interference node preferentially permitting mode. The low-interference node preferentially permitting mode is a method assumed to be applied when the use of radio waves by the primary system is for a very short period and non-periodical. For example, it is applied for protecting a navigation area of a shipborne radar set on the sea, called DPA (Dynamic Protection Area). In FIG. 13, all communication devices 20 are means for detecting the use of radio waves by the primary system. In a case of DPA, that is, a case of shipborne radar, disclosed is detection of radar radio waves by a radio sensing system called ESC (Environmental Sensing Capability).

In this method, the interference margin simultaneous distribution processing like the above-described method is not performed. The communication control apparatus 40 estimates the interference quantity that may be given to the primary system by each secondary system based on the operation parameter of the secondary system or a desired operation parameter of the secondary system to be operated anew. Then, the communication control apparatus 40 preferentially allows the secondary system with the smallest interference quantity to use the radio wave. Even though the secondary system with a large interference quantity is also allowed to use the radio wave, processing for stopping the use of the radio wave is executed when the use of the radio wave by the primary system is detected by the means for detecting the use of radio waves described above. A set of secondary systems for which the measure for stopping the radio wave is taken when the use of the radio wave is detected is defined as DPA Move List in Non Patent Literature 2.

For the low-interference node preferentially permitting mode in particular, unlike the interference margin simultaneously distribution mode, no radio-wave use permission method for a new secondary system is disclosed. The embodiment provides means for effectively allowing a new secondary system to use the radio wave even in a case of applying the primary system protection method of low-interference node preferentially permitting mode.

5. Operations of Communication System

Next, operations of the communication system 2 (the secondary system) will be described.

5-1. Communication Control Processing

First, communication control processing executed by the communication system 2 will be described. The communication control processing is the processing related to radio transmission of a single or a plurality of communication devices 20 (secondary systems) that perform wireless communication by utilizing the radio wave of the frequency band used by a single or a plurality of communication systems 1 (primary systems).

Figure 14:
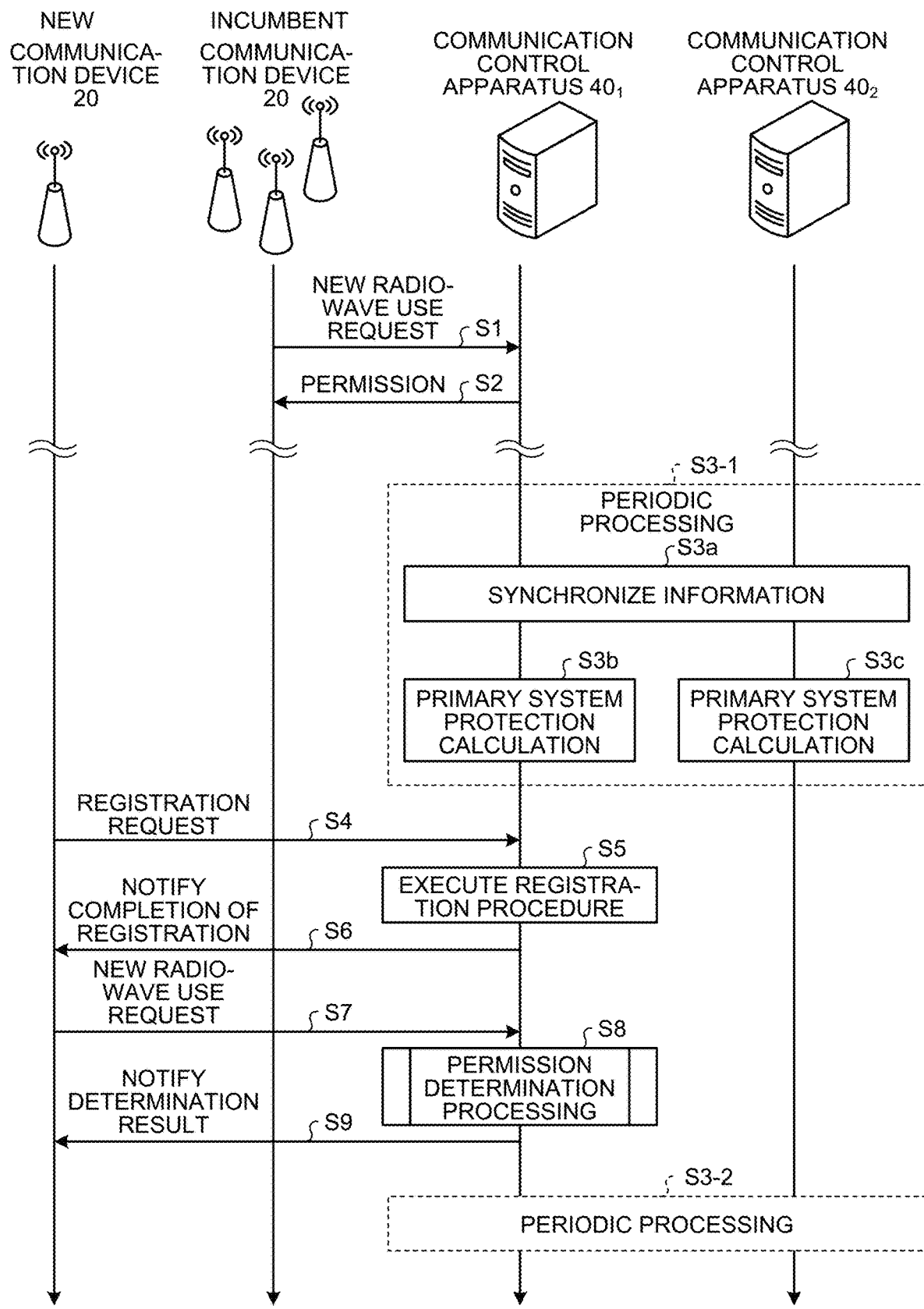
FIG. 14 is a sequence chart illustrating an example of communication control processing according to the embodiment of the present disclosure.

FIG. 14 is a sequence chart illustrating an example of the communication control processing according to the embodiment of the present disclosure. While there are only two communication control apparatuses 40 illustrated in FIG. 14, there may be more than two communication control apparatuses 40. Naturally, there may also be only one communication control apparatus 40. Each of the communication control apparatuses 40 may perform the same processing. For example, each of the communication control apparatuses 40 may determine the operation parameters of all of the communication devices 20 provided in the communication system 2. In that case, each of the communication control apparatuses 40 determines the same operation parameter for a prescribed communication device 20.

In the following explanations, in order to promote understanding, it is assumed that the communication control apparatus $40_1$ is the entity of the processing when it is necessary to specify the individual communication control apparatuses 40. Naturally, another communication control apparatus 40 (for example, the communication control apparatus $40_2$) may also be the entity of the processing. Furthermore, the communication control apparatuses 40 may perform the same processing (for example, the processing described hereinafter) simultaneously. The communication control apparatus 40 may control wireless communication of the terminal device 30 via the communication device 20 or directly. In that case, the communication device 20 described hereinafter may be replaced with the terminal device 30. As described above, the terminal device 30 is also a kind of communication device.

The processing will be described hereinafter under the following assumptions.

(Assumption 1) The communication control apparatus 40 performs a protection calculation of the primary system while periodically synchronizing the information with the other communication control apparatus 40.

(Assumption 2) The secondary system having a radio-wave use permission at the point of starting information synchronization is called "incumbent secondary system" or "incumbent communication device 20".

(Assumption 3) The secondary system that is wishing to start to use the radio wave anew (make a new radio-wave use request) after the protection calculation of the primary system until the next periodic processing is called "new secondary system" or "new communication device 20".

While the incumbent secondary system (the incumbent communication device 20) is also a "new secondary system (new communication device 20)" at the time of new radio-wave use request, it is assumed to have properly completed the procedure for acquiring the radio-wave use permission, in order to promote understanding.

Hereinafter, the communication control processing according to the embodiment of the present disclosure will be described. The communication processing presented hereinafter is started when the device is turned on, for example.

First, the acquisition unit 441 of the communication control apparatus 40₁ acquires a new radio-wave use request from an incumbent communication device 20 (step S1). Then, the notification unit 445 of the communication control apparatus 40₁ notifies a radio-wave use permission to the incumbent communication device 20 (step S2).

Subsequently, each of the communication control apparatuses 40 executes the processing that is performed periodically (referred to as periodic processing hereinafter) (step S3-1). First, each of the communication control apparatuses 40 synchronizes the information with the other communication control apparatus 40 (step S3a). Then, each of the communication control apparatuses 40 performs a protection calculation of the primary system (step S3b, step S3c). For example, the first determination unit 442 of the communication control apparatus 40 performs a protection calculation based on a known method for the communication system (the primary system) that applies "interference margin (acceptable interference quantity) simultaneous distribution mode". For the communication system (the primary system) that applies "low-interference node preferentially permitting mode", the first determination unit 442 of the communication control apparatus 40 determines and records the following pieces of information (1) to (3) as the protection calculation of the primary system.

(1) Estimated value of interference quantity that may be applied individually to the primary system by each communication node (2) Move List (3) Residual interference margin Note here that the communication node is the communication device 20, for example. Furthermore, the residual interference margin is the remaining interference margin. The residual interference margin may include the interference margin reserved in advance. Furthermore, "Move List" is a group of communication nodes (communication nodes to be forcibly stopped) that are normally allowed to use the radio wave but are required to stop the use of radio wave only when the use of radio wave by the primary system is detected. Hereinafter, "Move List" may also be called "forcible stop list". In the explanations below, the communication node (the communication device 20) that is required to stop the use of radio wave only when the use of radio wave by the primary system is detected may also be called "the system to be forcibly stopped".

Figure 15:
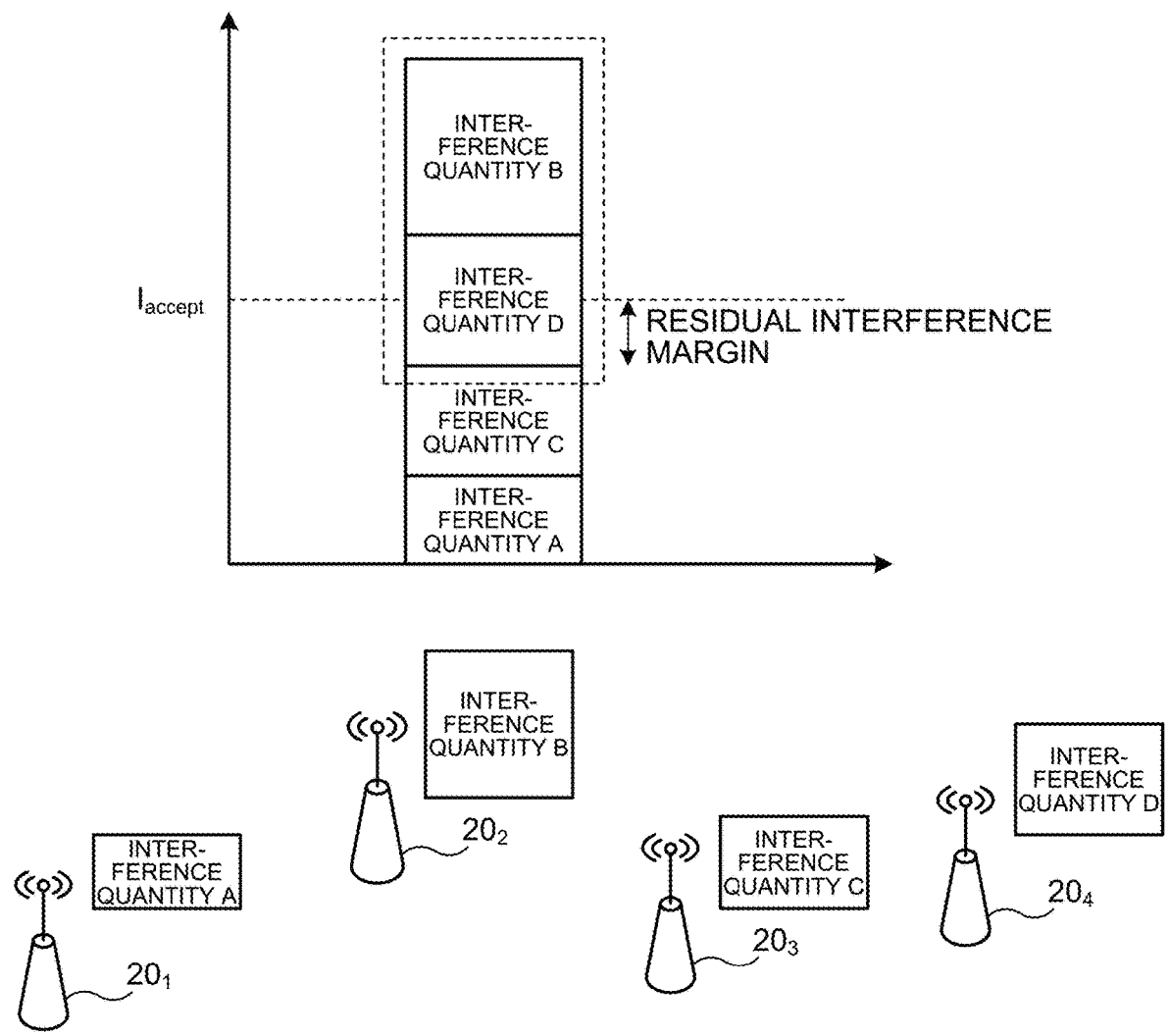
FIG. 15 is an explanatory diagram for describing a residual interference margin in the primary system protection method of low-interference node preferentially permitting mode.

The first determination unit 442 performs a calculation of the forcible stop list (Move List) in the following procedure, for example. First, the first determination unit 442 estimates the interference quantity of each secondary system (each communication device 20, for example), and sorts the secondary systems in an ascending order of the interference quantity. Thereafter, the first determination unit 442 sequentially compares the cumulative interference quantity with the acceptable interference quantity in that order. In the example of FIG. 15, the first determination unit 442 first evaluates an interference quantity A. The interference quantity A is below the acceptable interference quantity, so that the sum acquired by adding an interference quantity C (that is, A+C) is compared next with the acceptable interference quantity. This value is also below the acceptable interference quantity, so that the sum acquired by further adding an interference quantity D (that is, A+C+D) is then compared with the acceptable interference quantity. This value exceeds the acceptable interference quantity. Thus, the communication device 20₄ and the secondary system (the communication device 20₂ herein) giving the interference larger than the communication device 20₄ does are stored in the Move List.

It is desirable that such information be recorded for each of the interference calculation reference points (also referred to as Protection Point, Reference Point) in the protection calculation of the primary system. Furthermore, it is desirable to be recorded for each frequency. In the example of FIG. 15, the difference between $I_{accept}$ and the interference quantity A+C is the residual interference margin.

Subsequently, the acquisition unit 441 of the communication control apparatus 40₁ receives a registration request from a new communication device 20 before the next periodic processing (step S3-2 illustrated in FIG. 14) (step S4). Then, the registration unit 443 of the communication control apparatus 40₁ executes a registration procedure of the new communication device 20 (step S5). In the registration procedure, the following information is registered, for example.

(1) Information specific to the secondary system (serial number, product model information, and the like)

(2) Set position information (latitude, longitude, altitude, accuracy information at the time when positional information is acquired, and the like)

(3) Antenna information (position, height, facing direction, beam pattern, and the like)

(4) Wireless interface information (identifier indicating wireless standards, version information, duplex mode information, and the like)

(5) Public certification information (public certification number and ID, maximum EIRP, supportable frequency band, and the like)

(6) Installer information (installer ID, digital signature, contact information, and the like)

Note that the new communication device 20 generates a registration request by using the device parameter, and notifies it to the communication control apparatus 40. At this time, when installer information is included in the device parameter, the new communication device 20 may use that information to perform tamper-proof processing and the like on the registration request. Furthermore, encryption processing may be applied to a part or the whole of the information included in the registration request. As for the set position information, the installer may directly write it in the communication control apparatus 40, for example.

Then, after the registration unit 443 performs the registration processing of the new communication device 20, the notification unit 445 of the communication control apparatus 40₁ transmits a registration completion notification according to the result of the registration processing (step S6). Note that the registration procedure may be omitted. In such a case, however, at least the positional information and the specific information capable of identifying the secondary system out of the above-described parameters are enclosed in the radio-wave use request.

Subsequently, the acquisition unit 441 of the communication control apparatus $40_1$ receives a new radio-wave use request from the new communication device 20 (step S7). Note that the radio-wave use request may be notified integrally with the registration request. Then, the second determination unit 444 of the communication control apparatus $40_1$ executes permission determination processing (step S8). The permission determination processing will be described later. Then, the notification unit 445 of the communication control apparatus $40_1$ notifies a permission determination result (permitted or unpermitted) to the new communication device 20 (step S9). When the use of radio wave is permitted, the new communication device 20 performs radio transmission as necessary.

The first determination unit 442 of the communication control apparatus $40_1$ executes the periodic processing again after a specific time has passed (for example, after one day) from the previous periodic processing (step S3-1 illustrated in FIG. 14) (step S3-2). In the periodic processing, the operation parameter of the communication device 20 is determined. In the explanations below, the period of the periodic processing may also be referred to as a determination period of the operation parameter.

5-2. Permission Determination Processing

Figure 16:
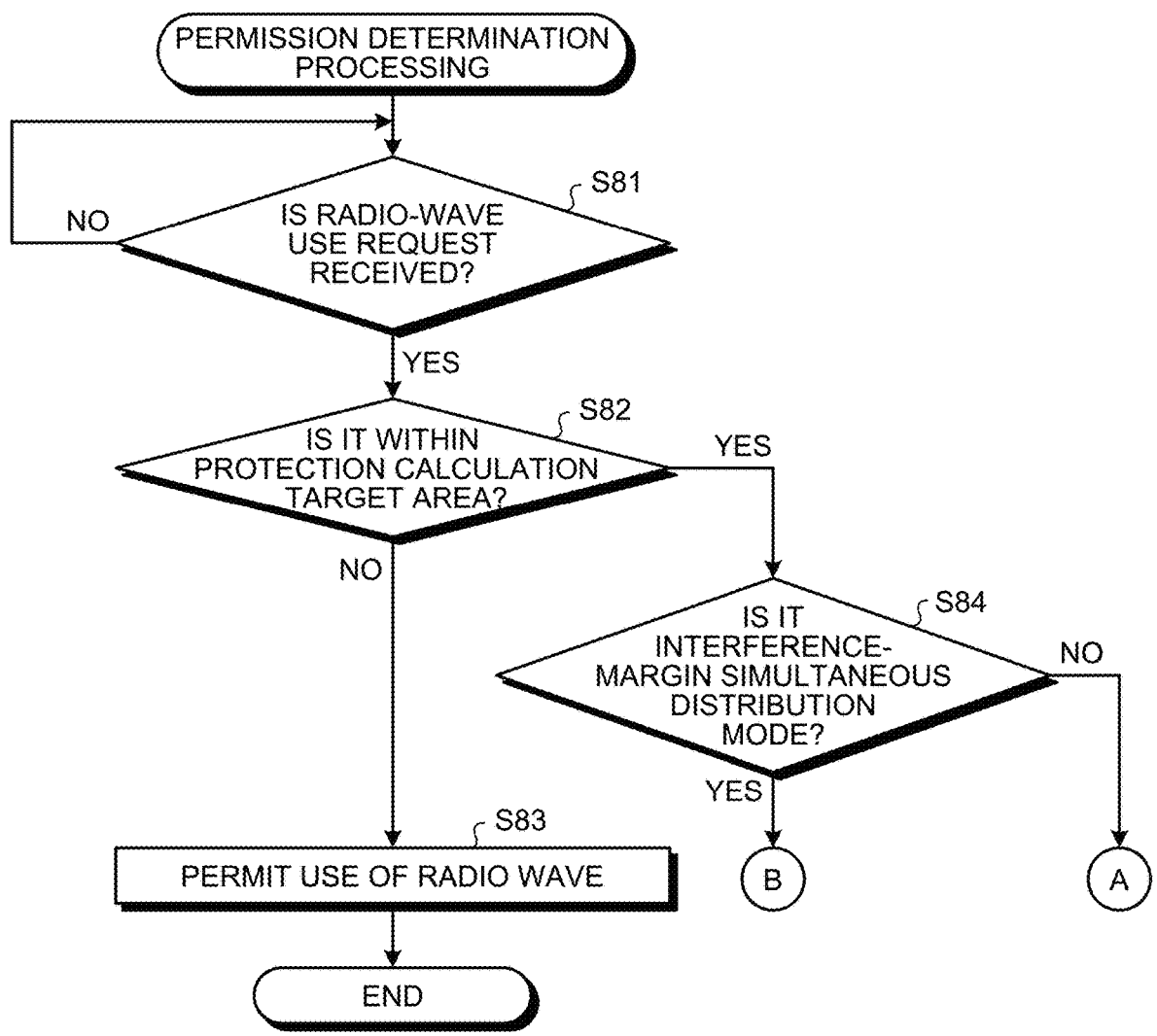
FIG. 16 is a flowchart illustrating an example of permission determination processing according to the embodiment of the present disclosure.

Next, the permission determination processing will be described. FIG. 16 is a flowchart illustrating an example of the permission determination processing according to the embodiment of the present disclosure. The permission determination processing is the processing for determining whether or not to allow the new communication device 20 (the new secondary system) to use the radio wave. The permission determination processing is executed in the determination period of the operation parameter (between the periodic processing and the periodic processing). For example, the permission determination processing is executed at step S8 of the communication control processing described above.

First, the second determination unit 444 of the communication control apparatus $40_1$ determines whether or not a radio-wave use request is received from the new communication device 20 (the new secondary system) (step S81). When the radio-wave use request is not received (step S81: No), the second determination unit 444 repeats step S81 until receiving the radio-wave use request.

When the radio-wave use request is received (step S81: Yes), the second determination unit 444 determines whether or not the new communication device 20 is a target of the protection calculation of the primary system. Specifically, the second determination unit 444 determines whether or not the new communication device 20 is within a target area of the protection calculation of at least a single communication system 1 (primary system) among the communication systems 1 (primary systems) (step S82). For example, the second determination unit 444 determines the position of the new communication device 20 based on the positional information included in the radio-wave use request or based on the registered positional information. Then, based on the determined positional information, the second determination unit 444 determines whether or not the new communication device 20 is within a target area of the protection calculation of at least a single communication system 1 (primary system).

Note that the target area of the protection calculation of the primary system may also be called a neighborhood area (for example, Non Patent Literature 2). In the explanations below, the target area of the protection calculation of the primary system (the communication system 1) may also be referred to as "protection calculation target area".

When the new communication device 20 is not included in any of the protection calculation target areas (step S82: No), it is unnecessary to perform the protection calculation of the primary system, so that the second determination unit 444 allows the new communication device 20 to use the radio wave (step S83). When the new communication device 20 is included in one of the protection calculation target areas (step S82: Yes), the second determination unit 444 shifts the processing to step S84.

At step S82, it is determined whether or not the new communication device 20 is the target of the protection calculation of the primary system by determining whether or not the new communication device 20 is included in any of the protection calculation target areas. However, whether or not it is the target of protection calculation of the primary system may not necessarily need to be determined based on the positional information. For example, whether or not it is the target of the protection calculation of the primary system may be determined based on the estimated value of the applied interference quantity. For example, when the applied interference quantity of the new communication device 20 is extremely low (for example, when the applied interference quantity is equal to or less than a prescribed threshold value), the second determination unit 444 determines that the new communication device 20 is a target of the protection calculation of the primary system.

When the communication device 20 is the target of the protection calculation of any of the primary systems (step S82: Yes), the second determination unit 444 determines whether or not the protection calculation method is of the interference-margin simultaneous distribution mode in regards to the primary system to be the protection target (step S84). When at least one of the primary systems to be the protection target is the interference-margin simultaneous distribution mode, the second determination unit 444 shifts the processing to a process B. If not, that is, when all of the primary systems to be the protection target are the low-interference node preferentially permitting mode, the second determination unit 444 shifts the processing to the process B.

In the embodiment, "radio-wave use permission" includes permitting the use of radio wave based on the requested operation parameter, permitting the use of the radio wave based on the corrected value (acquired in the process B) of the requested operation parameter, and the like. That is, "radio-wave use permission" for the new communication device 20 (the new secondary system) that proceeds to the process A from the beginning means permitting the use of the radio wave based on the requested operation parameter, while "radio-wave use permission" for the new secondary system that proceeds to the process B first means permitting the use of the radio wave based on the corrected value of the requested operation parameter.

5-3. Process A of Permission Determination Processing

First, the processing of the process A will be described. The process A includes a protection calculation process in regards to the low-interference node preferentially permitting mode. As the process A, any of the following three kinds of methods (options A1 to A3) may be applied. When the operation parameter is not designated in the radio-wave use request, it is possible to proceed to this calculation process after finishing presetting based on the minimum requirement. There is no specific limit set for the presetting method.

(Option A1)

Figure 17:
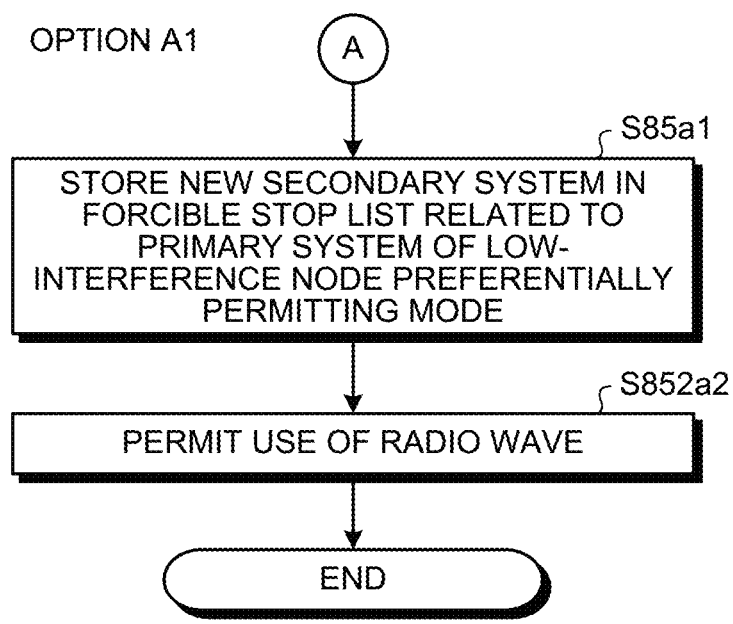
FIG. 17 is a flowchart illustrating a first option of a process A of the permission determination processing.

FIG. 17 is a flowchart illustrating the processing of an option A1 (a first option) of the process A of the permission determination processing.

First, the second determination unit 444 stores the new communication device 20 (the new secondary system) in the forcible stop list regarding all of the primary systems as the protection target (step S85a1). Then, the second determination unit 444 allows the new communication device 20 to use the radio wave (step S85a2). Then, the second determination unit 444 ends the permission determination processing.

In this manner, the operation of the new secondary system can be permitted without affecting the result of the calculation performed in the "periodic processing" right before. The other options are based on the same concept as that of the option A1.

After the use of the radio wave is permitted, if the detection unit 446 of the communication control apparatus $40_1$ detects the use of the radio wave by any of the primary systems as the protection target, the notification unit 445 of the communication control apparatus $40_1$ notifies the communication devices 20 (including the new communication device 20) on the forcible stop list to stop the use of the radio wave.

(Option A2)

Figure 18:
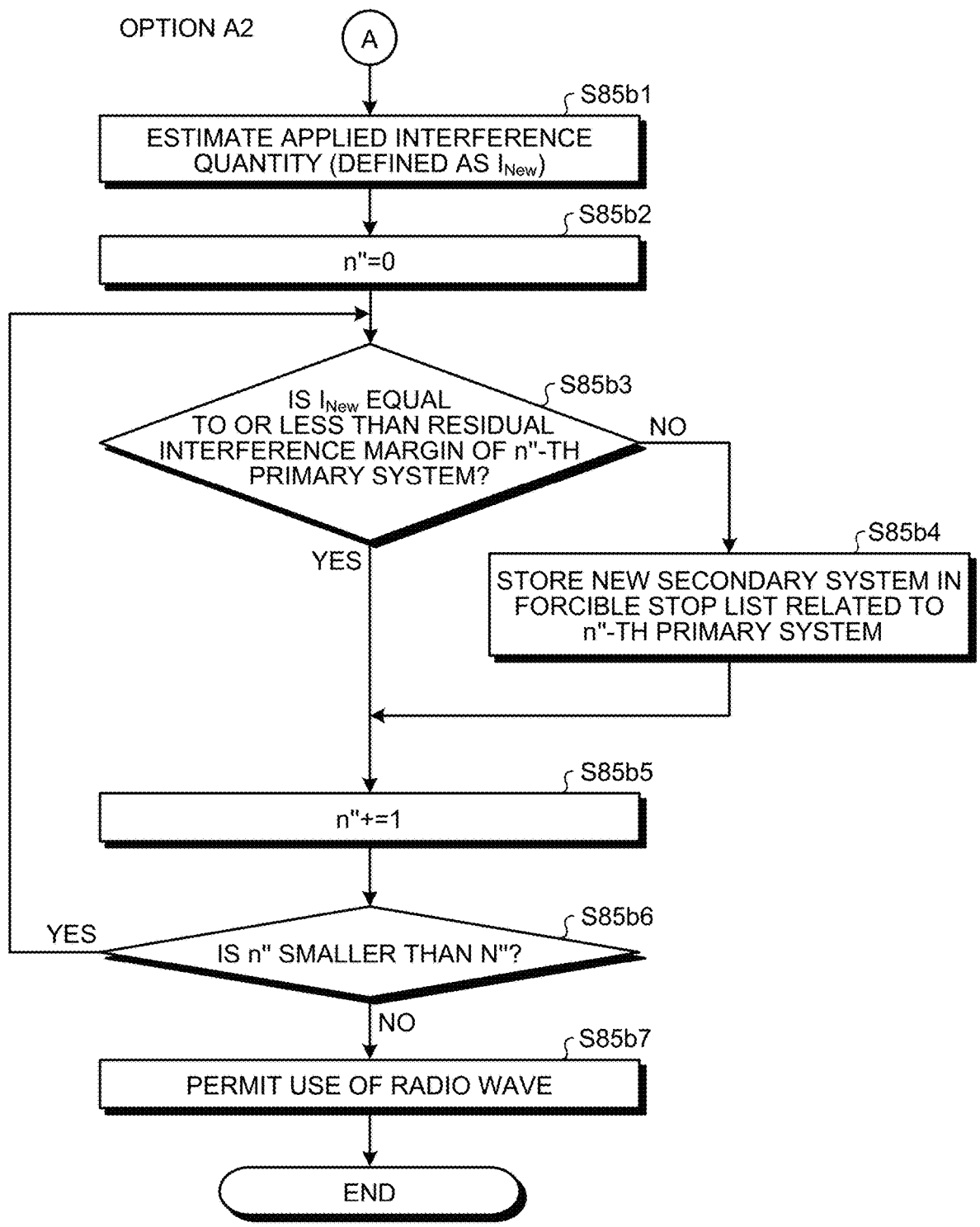
FIG. 18 is a flowchart illustrating a second option of the process A of the permission determination processing.

FIG. 18 is a flowchart illustrating the processing of an option A2 (a second option) of the process A of the permission determination processing. The option A2 further includes a process with which the new secondary system having the estimated applied interference quantity that is equal to or less than the residual interference margin is not stored in the forcible stop list.

First, the second determination unit 444 estimates the interference quantity (referred to as the applied interference quantity hereinafter) given to the primary system by the new communication device 20 (step S85b1). In the explanations below, the estimated applied interference quantity is defined as the interference quantity $I_{New}$.

Then, the second determination unit 444 resets (clears to 0) a variable n" (step S85b2). Thereafter, the second determination unit 444 determines whether or not the interference quantity $I_{New}$ is equal to or less than the residual interference margin of the n"-th primary system (step S85b3). When determined to be equal to or less than the residual interference margin (step S85b3: Yes), the second determination unit 444 advances the processing to step S85b5.

When determined to be over the residual interference margin (step S85b3: No), the second determination unit 444 stores the new communication device 20 in the forcible stop list of the n"-th primary system (step S85b4).

Subsequently, the second determination unit 444 adds 1 to the variable n" (step S85b5). Thereafter, the second determination unit 444 determines whether or not n" is smaller than N" (step S85b6). Note here that N" is the value acquired by subtracting the number of protection calculation target areas N' of the primary system of interference-margin simultaneous distribution mode from the number of protection calculation target areas N of the primary system. That is, N" is the number of protection calculation target areas of the primary system of the low-interference node preferentially permitting mode.

When n" is smaller than N" (step S85b6: Yes), the second determination unit 444 returns the processing to step S85b3. When n" is equal to or less than N" (step S85b6: No), the second determination unit 444 allows the new communication device 20 to use the radio wave (step S85b7). Then, the second determination unit 444 ends the permission determination processing.

(Option A3)

Figure 19:
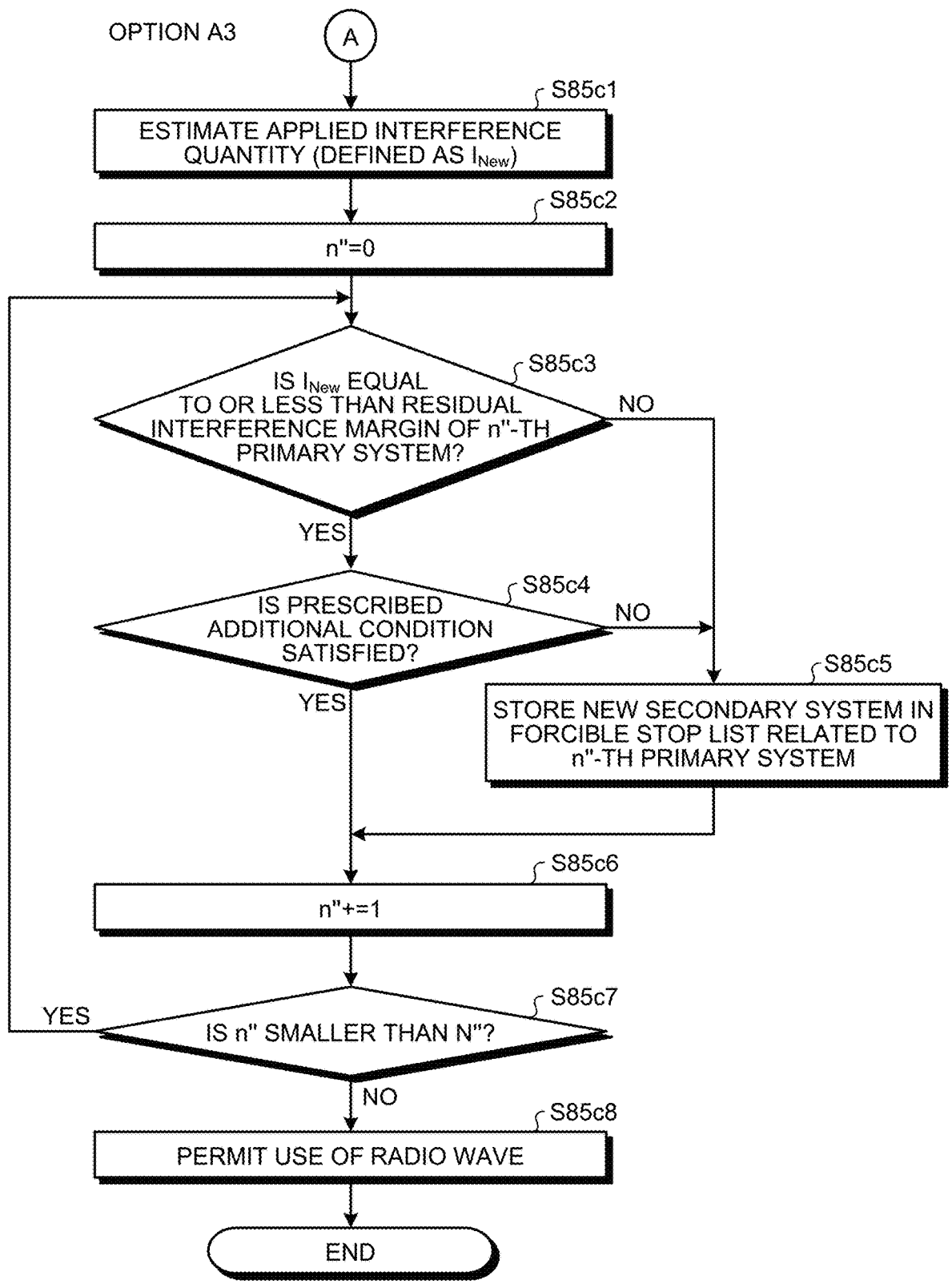
FIG. 19 is a flowchart illustrating a third option of the process A of the permission determination processing.

FIG. 19 is a flowchart illustrating the processing of an option A3 (a third option) of the process A of the permission determination processing. The option A3 further includes a process with which the new secondary system having the applied interference quantity not exceeding the maximum applied interference quantity of the incumbent secondary system that is out of the forcible stop list is not stored in the forcible stop list.

First, the second determination unit 444 estimates the interference quantity (referred to as the applied interference quantity hereinafter) given to the primary system by the new communication device 20 (step S85c1). In the explanations below, the applied interference quantity estimated at this step is defined as the interference quantity $I_{New}$.

Then, the second determination unit 444 resets (clears to 0) the variable n" (step S85c2). Thereafter, the second determination unit 444 determines whether or not the interference quantity $I_{New}$ is equal to or less than the residual interference margin of the n"-th primary system (step S85c3). When determined to be over the residual interference margin (step S85c3: No), the second determination unit 444 advances the processing to step S85c5.

When determined to be equal to or less than the residual interference margin (step S85b3: Yes), the second determination unit 444 determines whether or not the new communication device 20 satisfies a prescribed additional condition (step S85c4). As examples of the prescribed additional conditions, the following conditions (D1) to (D3) may be assumed.

(D1) The interference quantity $I_{New}$ is the quantity that does not exceed the maximum value of the applied interference quantity of the incumbent secondary system that is not included in the current forcible stop list. For example, when the applied interference quantity of the new communication device 20 exceeds the largest applied interference quantity among the respective applied interference quantities of the communication devices 20 (the incumbent secondary systems) currently defined as the systems to be stopped forcibly, the second determination unit 444 determines that the new communication device 20 does not satisfy the prescribed additional condition.

(D2) The new secondary system is of a low-output class. For example, when the new communication device 20 is not a wireless system of a low-output class with the output smaller than a prescribed output, the second determination unit 444 determines that the new communication device 20 does not satisfy the prescribed additional condition.

(D3) The new secondary system is placed indoors. For example, when the new communication device 20 is not a wireless system placed indoors, the second determination unit 444 determines that the new communication device 20 does not satisfy the prescribed additional condition.

When the interference quantity $I_{New}$ exceeds the residual interference margin (step S85c3: No) or the new communication device 20 does not satisfy the prescribed additional condition (step S85c4: No), the second determination unit 444 stores the new communication device 20 in the forcible stop list regarding the n"-th primary system (step S85c5).

Subsequently, the second determination unit 444 adds 1 to the variable n" (step S85c6). Thereafter, the second determination unit 444 determines whether or not n" is smaller than N" (step S85b7). Note here that N" is the number of protection calculation target areas of the primary system of the low-interference node preferentially permitting mode.

When n" is smaller than N" (step S85c7: Yes), the second determination unit 444 returns the processing to step S85b3. When n" is equal to or less than N" (step S85c7: No), the second determination unit 444 allows the new communication device 20 to use the radio wave (step S85c8). Then, the second determination unit 444 ends the permission determination processing.

Note that the option A3 is equivalent to checking the calculation result that is acquired when it is assumed that the new communication device 20 (the new secondary system) is the calculation target of the "periodic processing" performed right before. The case of FIG. 15 will be described as an example. In FIG. 15, it is a border line whether or not to include the communication device $20_3$ and the communication device $20_4$ in the forcible stop list. The determination processing performed in the option A3 is equivalent to permitting an operation when there is no change in the border line even if a calculation is performed assuming that the new communication device 20 is a calculation target of the "periodic processing", and rejecting the operation if not. While the calculation amount is increased compared to the option A2, the option A3 is the method capable of acquiring stricter calculation values.

(Application Examples of Each Option)

Those options can be selectively used according to the registered information on the communication device 20. For example, the second determination unit 444 applies the option A1 to the communication device whose transmission power class information indicates high output (for example, the communication device 20 with the output larger than a prescribed threshold value). Furthermore, the second determination unit 444 applies the option A3 for the communication device whose transmission power class information indicates low output (for example, the communication device 20 with the output smaller than the prescribed threshold value). Furthermore, the option A2 may be used for the communication device whose transmission power class information indicates low output (for example, the communication device 20 with the low output smaller than the prescribed threshold value) placed indoors.

Furthermore, it is also possible to selectively use the options based on the number of communication devices 20. If there is an extremely large number of new secondary systems that need to be processed simultaneously (for example, more than a first threshold value), the second determination unit 444 uses the option A1 for decreasing the calculation load. If there is a slightly small number of new secondary systems (for example, when the number is less than the first threshold value and more than a second threshold value), the second determination unit 444 uses the option A2 or the option A3.

Furthermore, when the option A1 is performed in the process A, the permission determination processing for the new communication device 20 that undergoes only the process A may be completed during the registration procedure or after completing the registration procedure until a radio-wave use request.

5-4. Process B of Permission Determination Processing

Next, the processing of the process B will be described. The process B includes a protection calculation process in regards to the interference-margin simultaneous distribution mode. As the process B, any of the following three kinds of methods (options B1 to B3) may be applied.

(Option B1)

Figure 20:
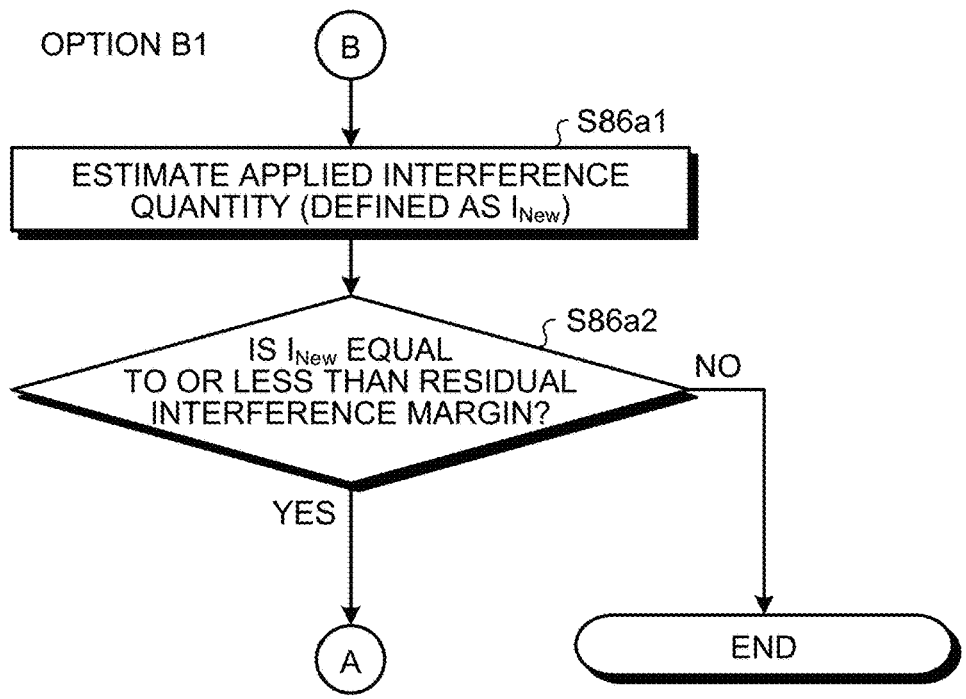
FIG. 20 is a flowchart illustrating a first option of a process B of the permission determination processing.

FIG. 20 is a flowchart illustrating the processing of an option B1 (a first option) of the process B of the permission determination processing.

First, the second determination unit 444 estimates the applied interference quantity of the new communication device 20 (step S86a1). In the explanations below, the estimated applied interference quantity is defined as $I_{New}$.

Subsequently, the second determination unit 444 determines whether or not the interference quantity $I_{New}$ is equal to or less than the residual interference margin (step S86a2). The residual interference margin may be the margin value reserved in advance by the communication control apparatus $40_1$. When the interference quantity $I_{New}$ is equal to or less than the residual interference margin (step S86a2: Yes), the processing is advanced to the process A. At this time, as for the process A, any of the options A1 to A3 may be applied.

When the interference quantity $I_{New}$ is larger than the residual interference margin (step S86a2: No), the second determination unit 444 ends the permission determination processing. That is, communication of the new communication device 20 (the new secondary system) is not permitted.

(Option B2)

Figure 21:
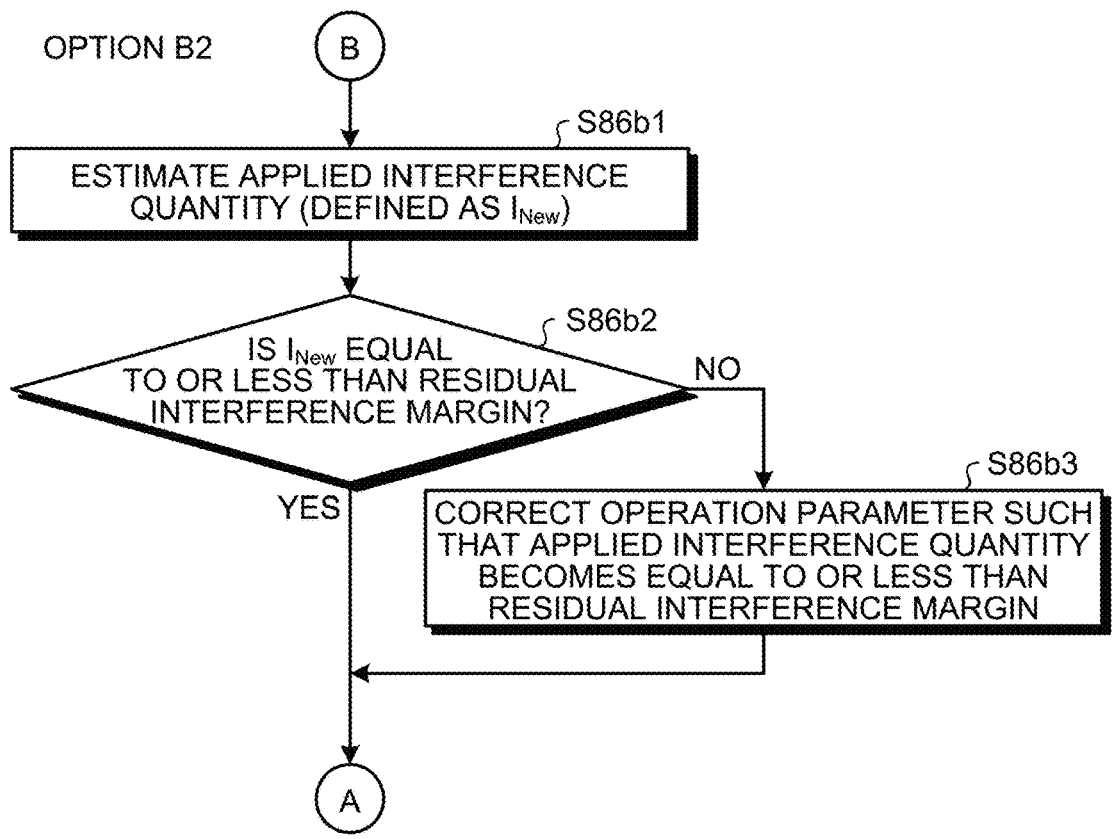
FIG. 21 is a flowchart illustrating a second option of the process B of the permission determination processing.

FIG. 21 is a flowchart illustrating the processing of an option B2 (a second option) of the process B of the permission determination processing.

First, the second determination unit 444 estimates the applied interference quantity (the interference quantity $I_{New}$) of the new communication device 20 (step S86b1).

Subsequently, the second determination unit 444 determines whether or not the interference quantity $I_{New}$ is equal to or less than the residual interference margin (step S86b2). When the interference quantity $I_{New}$ is equal to or less than the residual interference margin (step S86b2: Yes), the second determination unit 444 advances the processing to the process A.

When the interference quantity $I_{New}$ is larger than the residual interference margin (step S86b2: No), the second determination unit 444 corrects the operation parameter of the new communication device 20 such that the applied interference quantity of the new communication device 20 becomes equal to or less than the residual interference margin (step S86b3). The second determination unit 444 corrects the operation parameter of the new communication device 20 such that the applied interference quantity becomes equal to or less than the residual interference margin. It is desirable that the parameter to be corrected be only the maximum transmission power (EIRP). After completing the correction, the second determination unit 444 advances the processing to the process A.

(Option B3)

Figure 22:
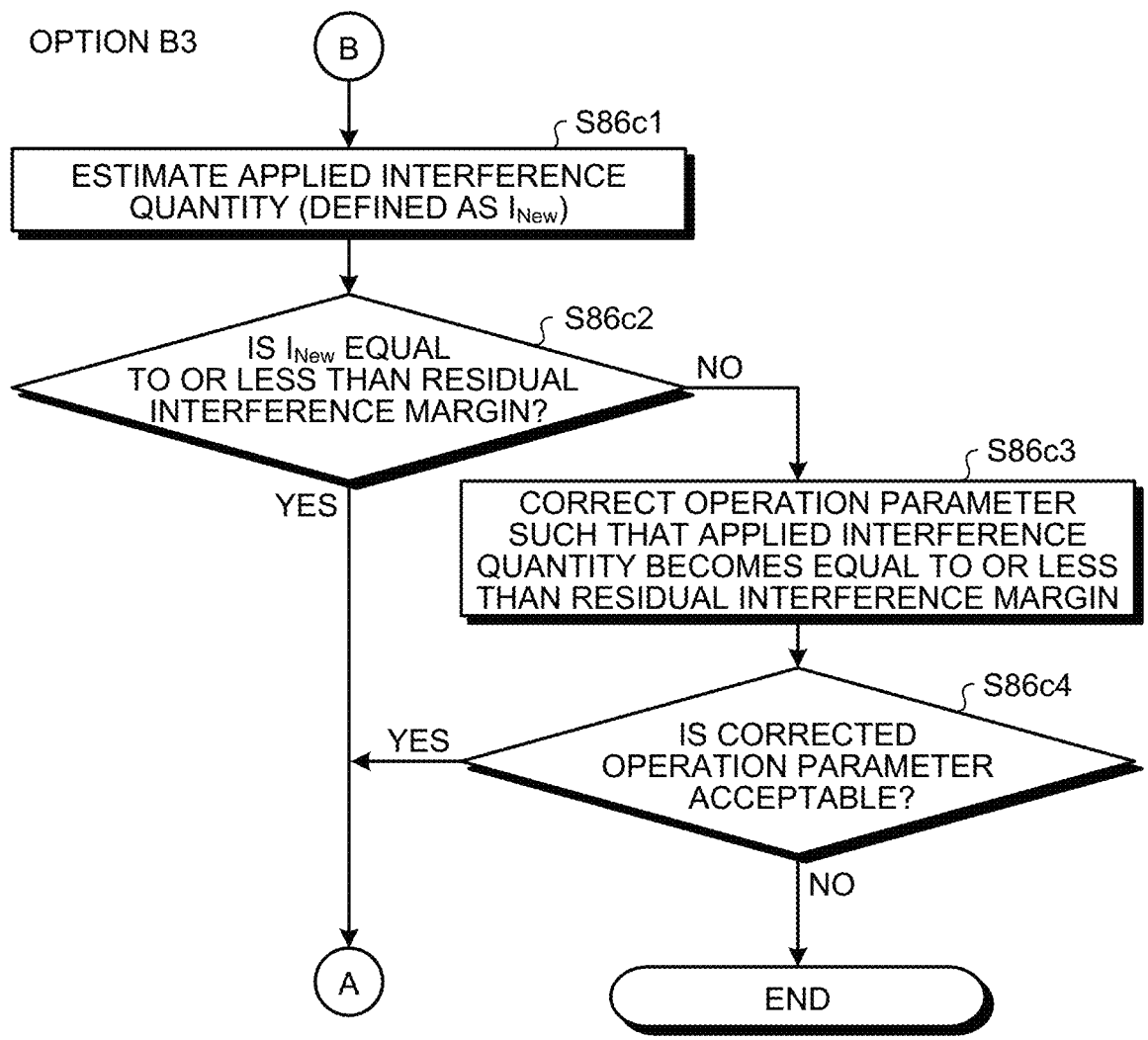
FIG. 22 is a flowchart illustrating a third option of the process B of the permission determination processing.

FIG. 22 is a flowchart illustrating the processing of an option B3 (a third option) of the process B of the permission determination processing. In the option B3, check processing of the corrected operation parameter is further provided. Thereby, the interference margin that cannot be used because the quantity that can be output is insufficient, for example, is allocated to the new communication device 20, so that it is possible to prevent the interference margin from being wasted.

First, the second determination unit 444 estimates the applied interference quantity (the interference quantity $I_{New}$) of the new communication device 20 (step S86c1).

Subsequently, the second determination unit 444 determines whether or not the interference quantity $I_{New}$ is equal to or less than the residual interference margin (step S86c2). When the interference quantity $I_{New}$ is equal to or less than the residual interference margin (step S86c2: Yes), the second determination unit 444 advances the processing to the process A.

When the interference quantity $I_{New}$ is larger than the residual interference margin (step S86c2: No), the second determination unit 444 corrects the operation parameter of the new communication device 20 such that the applied interference quantity of the new communication device 20 becomes equal to or less than the residual interference margin (step S86c3).

Then, the second determination unit 444 determines whether or not the corrected operation parameter is acceptable for the new communication device 20 (step S86c4). When the corrected operation parameter is acceptable for the new communication device 20, for example, when it is within an acceptable range as a desired parameter (step S86c4: Yes), the second determination unit 444 advances the processing to the process A.

When the corrected operation parameter is not acceptable for the new communication device 20 (step S86c4: No), the second determination unit 444 ends the permission determination processing. That is, communication of the new communication device 20 (the new secondary system) is not permitted. When ending the processing, it is desirable for the second determination unit 444 to provide a recommended operation parameter to the new communication device 20. This makes it possible for the new communication device 20 to make a communication request by using a recommended value.

6. Modifications

The embodiment described above illustrates an example, and various changes and applications thereof are possible.

6-1. Master and Slave

Figure 23:
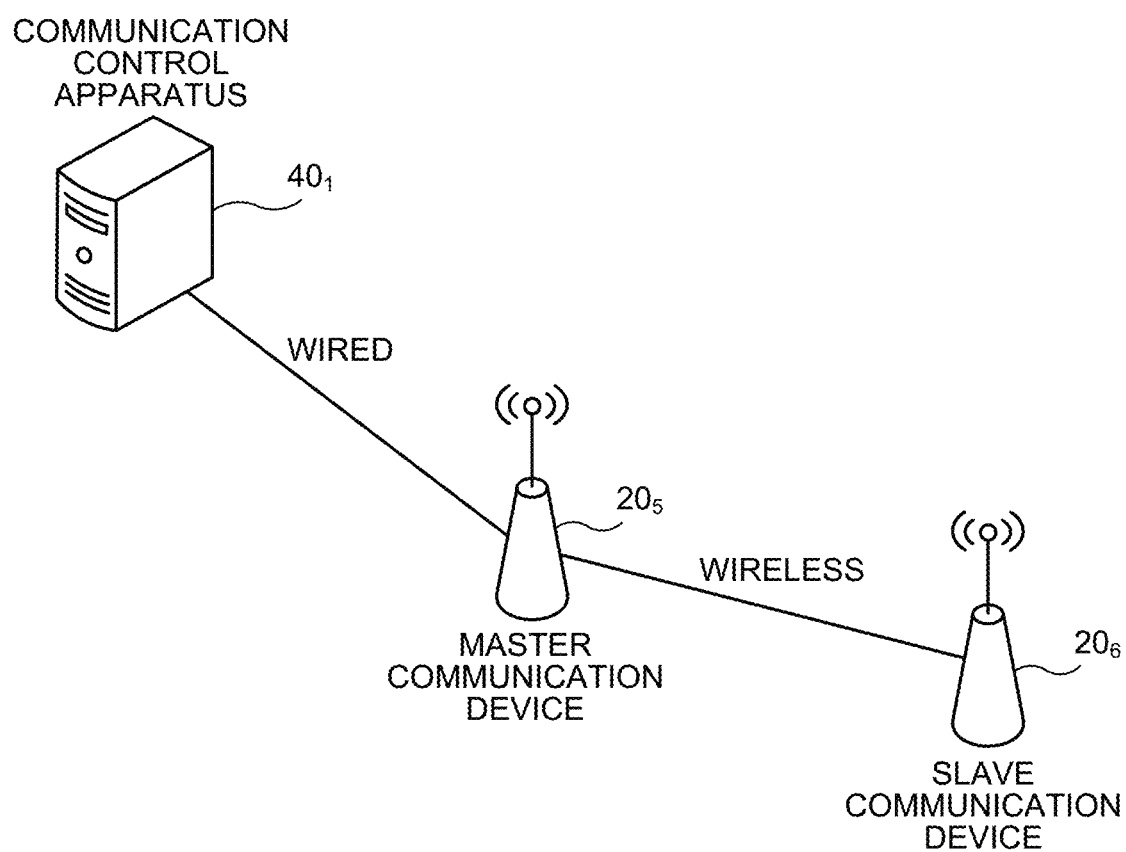
FIG. 23 is a diagram illustrating a state where the communication devices are connected to the communication control apparatus wirelessly.

There is a case where the communication device 20 that needs to access the communication control apparatus 40 connects thereto wirelessly. FIG. 23 is a diagram illustrating a state where a communication device $20_6$ connects to the communication control apparatus $40_1$ wirelessly. In the explanations below, the communication device 20 connected to the communication control apparatus $40_1$ wirelessly may be called a slave communication device. Furthermore, the communication device 20 to be the master of the slave communication device may be called a master communication device. In the example of FIG. 23, the communication device $20_6$ is the slave communication device, and the communication device $20_5$ is the master communication device. It is assumed here that the communication device $20_6$ uses the frequency requiring a permission of the communication control apparatus $40_1$ with a wireless interface. In such a case, the embodiment can be applicably employed.

First, the master communication device (the communication device $20_5$ in the example of FIG. 23) receives a permission for using the radio wave from the communication control apparatus 40 (the communication control apparatus $40_1$ in the example of FIG. 23) according to the process described above. At this time, in one of the procedures, it is desirable to register, with the communication control apparatus 40, an identifier indicating that there is a subordinate slave communication device (the communication device $20_6$ in the example of FIG. 23).

It is supposed here that the master communication device is stored in a forcible stop list regarding one of the primary systems. In such a case, in the radio-wave use request of the slave communication device, the communication control apparatus 40 stores the salve communication device in the same forcible stop list regardless of the position of the slave communication device.

This makes it possible to efficiently stop the slave communication device when it becomes necessary to forcibly stop the radio wave of the master communication device. Even in a case where the terminal device 30 such as a smartphone needs to access the communication control apparatus 40, the same procedure may be performed.

Note that parameters "transmitExpireTime (corresponding to radio transmission permission expiring time)" and "heartbeatInterval (corresponding to the access period for the SAS)" are defined in WINNF-TS-0016 SAS-CBSD Protocol, and the communication device (CBSD) performs radio transmission while accessing the SAS according to the parameters. If the slave communication device transmits the radio wave even though the master communication device stops the radio wave, it becomes a fruitless effort for the slave to try to access the communication control apparatus 40, and this may be inconvenient for the other communication devices 20 as well. Therefore, it can be effective means for avoiding such a case.

6-2. Modification Regarding System Configuration

The communication control apparatus 40 of the embodiment is not limited to the apparatus described in the embodiment. For example, the communication control apparatus 40 may be an apparatus having a function other than the function of controlling the communication device 20 that secondarily utilizes the frequency band subjected to frequency sharing. For example, the network manager may have the functions of the communication control apparatus 40 of the embodiment. At this time, the network manager may be a C-BBU (Centralized Base Band Unit) in a network configuration called C-RAN (Centralized Radio Access Network) or an apparatus including it, for example. Furthermore, the base station (including the access point) may have the functions of the network manager. Those apparatuses (the network manager and the like) can also be considered as the communication control apparatus.

In the embodiment described above, it is described that the communication system 1 is the first wireless system and the communication device 20 is the second wireless system. However, the first wireless system and the second wireless system are not limited to such examples. For example, the first wireless system may be a communication device (for example, the communication device 10), and the second wireless system may be a communication system (the communication system 2). Note that the wireless system referred in the embodiment is not limited to a system configured with a plurality of devices but may be replaced with "device" and "terminal" as appropriate.

Furthermore, while the communication control apparatus 40 is described as the apparatus belonging to the communication system 2 in the embodiment, it is not necessarily an apparatus belonging to the communication system 2. The communication control apparatus 40 may be an apparatus outside the communication system 2. The communication control apparatus 40 may not control the communication device 20 directly but may control the communication device 20 indirectly via a device configuring the communication system 2. Furthermore, there may be a plurality of secondary systems (communication systems 2). At this time, the communication control apparatus 40 may manage a plurality of secondary systems. In that case, each of the secondary systems may be considered as the second wireless system.

In frequency sharing in general, the incumbent system using the target band is called a primary system and the secondary user is called a secondary system. However, the primary system and the secondary system may be called by other terms. A macro cell in HetNET (Heterogeneous Network) may be a primary system, and a small cell and a relay station may be secondary systems. Furthermore, the base station may be a primary system, and Relay UE and Vehicle UE implementing D2D and V2X (Vehicle-to-Everything) existing within the coverage thereof may be secondary systems. The base station is not limited to a fixed type but may be a portable or mobile type.

Furthermore, the interface between entities may be a wired or wireless interface. For example, the interface between the entities (the communication control apparatuses, the communication devices, or the terminal devices) referred in the embodiment may be a wireless interface that does not depend on frequency sharing. Examples of the wireless interface that does not depend on frequency sharing may be a wireless interface provided by a mobile network operator via a Licensed band, and wireless LAN communication using an incumbent unlicensed band.

6-3. Another Modification

The control apparatus that controls the communication device 10, the communication device 20, the terminal device 30, and the communication control apparatus 40 according to the embodiment may be achieved by a dedicated computer system or may be achieved by a general-purpose computer system.

For example, the communication program for executing the above-described operations (for example, the communication control processing, the adjustment processing, and the distribution processing) is stored in a computer readable recording medium such as an optical disc, a semiconductor memory, a magnetic tape, or a flexible disk and distributed. Then, for example, the program is installed in a computer and the processing described above is executed to configure a control apparatus. At this time, the control apparatus may be an apparatus (for example, a personal computer) outside the communication device 10, the communication device 20, the terminal device 30, and the communication control apparatus 40. The control apparatus may also be a device (for example, the control unit 24, the control unit 34, or the control unit 44) inside the communication device 10, the communication device 20, the terminal device 30, or the communication control apparatus 40.

Furthermore, for example, the communication program may be stored in a disk device provided in a server device on a network such as the Internet and allowed to be downloaded on a computer. The functions described above may be implemented by an OS (Operating System) and application software in cooperation. In that case, the part other than the OS may be stored in a medium and distributed, or the part other than the OS may be stored in the server device to be downloaded or the like in a computer.

Furthermore, among pieces of processing described in the embodiment, the whole or a part of the processing described to be performed automatically may be performed manually, or the whole or a part of the processing described to be performed manually may be performed automatically by a known method. Moreover, the information including the processing procedure, specific names, and various kinds of data mentioned in the description and the drawings may be changed freely unless specifically noted. For example, various kinds of information illustrated in each of the drawings is not limited to the information illustrated therein.

Furthermore, each of the constituent elements of each of the devices illustrated in the drawings is the functional concept, and not necessarily configured physically as illustrated therein. That is, specific distributed or integrated form of each of the devices is not limited to that illustrated in the drawings but the whole of a part thereof may be configured in a distributed or integrated manner functionally or physically in an any unit depending on various loads, use conditions, and the like.

Furthermore, in the embodiment described above, the processing contents can be combined as appropriate in a range causing no conflict. Furthermore, the order of the steps illustrated in the sequence chart or the flowcharts of the embodiment can be changed as appropriate.

7. Conclusion

As described above, according to the embodiment of the present disclosure, the communication control apparatus 40 determines, when a radio-wave use request is received from the new secondary system during the determination period (between the determination processing and the determination processing) of the operation parameter of the secondary system, whether or not to define a new secondary system as the system to be forcibly stopped when the primary system uses the radio wave. Then, the communication control apparatus makes a notification to the new secondary system regarding a radio-wave use permission before the next determination period of the operation parameter. Thereby, the new secondary system can immediately start utilization of the radio frequency resource without waiting for the next determination period of the operation parameter, so that efficient utilization of radio frequency resources becomes possible.

While each of the embodiments of the present disclosure has been described heretofore, the technical scope of the present disclosure is not limited to each of the above-described embodiments, and various changes are possible without departing from the gist of the present disclosure. Furthermore, constituent elements of different embodiments or modifications may be combined as appropriate.

Furthermore, effects of each of the embodiments described in the specification are not limited thereto but simply presented as examples, and there may also be other effects.

Note that the present techniques may employ the following configurations.

(1)

A communication control apparatus, comprising:

a first determination unit that periodically determines an operation parameter related to radio transmission of each of a single or a plurality of second wireless systems that perform wireless communication by utilizing a radio wave of a frequency band used by a single or a plurality of first wireless systems;

a second determination unit that determines, when a radio-wave use request is received from a new second wireless system in a determination period of the operation parameter, whether or not to define the new second wireless system as a system to be forcibly stopped when the first wireless system uses the radio wave; and a notification unit that makes a notification to the new second wireless system regarding a radio-wave use permission before a next determination period of the operation parameter.

(2)

The communication control apparatus according to (1), wherein the second determination unit determines, when a prescribed method is applied for a protection calculation of at least one of the single or plurality of first wireless systems, whether or not to define the new second wireless system as the system to be forcibly stopped when the first wireless system to which the prescribed method is applied uses the radio wave.

(3)

The communication control apparatus according to (2), wherein the second determination unit defines the new second wireless system as the system to be forcibly stopped for all of the first wireless systems to which the prescribed method is applied for the protection calculation.

(4)

The communication control apparatus according to any one of (1) to (3), wherein the second determination unit determines, based on an interference quantity given to the first wireless system by the new second wireless system and a residual interference margin of the first wireless system, whether or not to define the new second wireless system as the system to be forcibly stopped when the first wireless system uses the radio wave.

(5)

The communication control apparatus according to any one of (1) to (4), wherein the second determination unit does not define the new second wireless system as the system to be forcibly stopped for the first wireless system in a case where an interference quantity given to the first wireless system by the new second wireless system is equal to or less than a residual interference margin of the first wireless system and in a case where the new second wireless system does not satisfy a prescribed additional condition, and defines the new second wireless system as the system to be forcibly stopped for the first wireless system in other cases.

(6)

The communication control apparatus according to (5), wherein, when the interference quantity given to the first wireless system by the new second wireless system exceeds the largest applied interference quantity among the applied interference quantities of the second wireless systems currently defined as the systems to be forcibly stopped, the second determination unit determines that the new second wireless system does not satisfy the prescribed additional condition.

(7)

The communication control apparatus according to (5), wherein, when the new second wireless system is not a wireless system of a low-output class with an output smaller than a prescribed output, the second determination unit determines that the new second wireless system does not satisfy the prescribed additional condition.

(8)

The communication control apparatus according to (5), wherein, when the new second wireless system is not a wireless system placed indoors, the second determination unit determines that the new second wireless system does not satisfy the prescribed additional condition.

(9)

The communication control apparatus according to (2), wherein the prescribed method includes a first method that preferentially allows the second wireless system of lower interference to use a part of or a whole part of the interference margin.

(10)

The communication control apparatus according to (9), wherein the first method is a primary system protection method of low-interference node preferentially permitting mode.

(11)

The communication control apparatus according to (2), wherein the prescribed method includes a second method that simultaneously distributes a part of or a whole part of the interference margin to the second wireless systems.

(12)

The communication control apparatus according to (11), wherein the second method is a primary system protection method of interference-margin simultaneous distribution mode.

(13)

The communication control apparatus according to (9), wherein for the protection calculation of at least one first wireless system out of the single or plurality of first wireless systems, a second method that simultaneously distributes a part of or whole part of the interference margin to the second wireless systems is applied, and when the interference quantity given by the new second wireless system to the first wireless system to which the second method is applied for the protection calculation is larger than a residual interference margin of the first wireless system, the second determination unit determines not to allow the new second wireless system to use the radio wave.

(14)

The communication control apparatus according to (9), wherein for the protection calculation of at least one first wireless system out of the single or plurality of first wireless systems, a second method that simultaneously distributes a part of or whole part of the interference margin to the second wireless systems is applied, and when the interference quantity given by the new second wireless system to the first wireless system to which the second method is applied for the protection calculation is larger than a residual interference margin of the first wireless system, the second determination unit corrects the operation parameter of the new second wireless system so as to become equal to or less than the residual interference margin of the first wireless system.

(15)

The communication control apparatus according to (14), wherein the second determination unit determines whether or not the corrected operation parameter is acceptable for the new second wireless system and, when the corrected operation parameter is not acceptable, determines not to allow the new second wireless system to use the radio wave.

(16)

The communication control apparatus according to (14) or (15), wherein the second determination unit determines, based on the corrected operation parameter, whether or not to define the new second wireless system as the system to be forcibly stopped when the first wireless system to which the first method is applied uses the radio wave.

(17)

The communication control apparatus according to any one of (1) to (16), wherein, when the new second system is determined as the system to be forcibly stopped, the second determination unit also determines a wireless system to be a slave of the new second wireless system as the system to be forcibly stopped.

(18)

A communication control method, comprising: periodically determining an operation parameter related to radio transmission of each of a single or a plurality of second wireless systems that perform wireless communication by utilizing a radio wave of a frequency band used by a single or a plurality of first wireless systems;

when a radio-wave use request is received from a new second wireless system in a determination period of the operation parameter, determining whether or not to define the new second wireless system as a system to be forcibly stopped when the first wireless system uses the radio wave; and making a notification to the new second wireless system regarding a radio-wave use permission before a next determination period of the operation parameter.

(19)

A communication control program causing a computer provided by a communication control apparatus to function as:

a first determination unit that periodically determines an operation parameter related to radio transmission of each of a single or a plurality of second wireless systems that perform wireless communication by utilizing a radio wave of a frequency band used by a single or a plurality of first wireless systems;

a second determination unit that determines, when a radio-wave use request is received from a new second wireless system in a determination period of the operation parameter, whether or not to define the new second wireless system as a system to be forcibly stopped when the first wireless system uses the radio wave; and a notification unit that makes a notification to the new second wireless system regarding a radio-wave use permission before a next determination period of the operation parameter.

(20)

A communication system, including:

a single or a plurality of second wireless systems that perform wireless communication by utilizing a radio wave of a frequency band used by a single or a plurality of first wireless systems; and a communication control apparatus that controls the single or the plurality of second wireless systems, in which the communication control apparatus includes:

a first determination unit that periodically determines an operation parameter related to radio transmission of each of the single or the plurality of second wireless systems;

a second determination unit that determines, when a radio-wave use request is received from a new second wireless system in a determination period of the operation parameter, whether or not to define the new second wireless system as a system to be forcibly stopped when the first wireless system uses the radio wave; and a notification unit that makes a notification to the new second wireless system regarding a radio-wave use permission before a next determination period of the operation parameter.

REFERENCE SIGNS LIST 1, 2 Communication system
10, 20 Communication device
30 Terminal device
40 Communication control apparatus
21, 31, 41 Wireless communication unit
22, 32, 42 Storage unit
23, 43 Network communication unit
24, 34, 44 Control unit
211, 311 Reception processing unit
212, 312 Transmission processing unit
441 Acquisition unit
442 First determination unit
443 Registration unit
444 Second determination unit
445 Notification unit
446 Detection unit

The invention claimed is:

1. A communication control apparatus, comprising:
a first determination circuit that periodically determines an operation parameter related to radio transmission of each of a single or a plurality of second wireless systems that perform wireless communication by utilizing at least part of a frequency band used by a single or a plurality of first wireless systems;
a second determination circuit that determines, when a radio-wave use request is received from a new second wireless system between determination periods of the operation parameter, whether or not to define the new second wireless system as a system to be forcibly stopped for the first wireless system; and
a notification circuit that makes a notification to the new second wireless system regarding a radio-wave use permission before a next determination period of the operation parameter,
wherein the second determination circuit:
does not define the new second wireless system as the system to be forcibly stopped for the first wireless system in a case where an interference quantity given to the first wireless system by the new second wireless system is equal to or less than a residual interference margin of the first wireless system; and
defines the new second wireless system as the system to be forcibly stopped for the first wireless system in other cases.

2. The communication control apparatus according to claim 1, wherein the second determination circuit determines, when a prescribed method is applied for a protection calculation of at least one of the single or plurality of first wireless systems, whether or not to define the new second wireless system as the system to be forcibly stopped for the first wireless system to which the prescribed method is applied.

3. The communication control apparatus according to claim 2, wherein the second determination circuit defines the new second wireless system as the system to be forcibly stopped for all of the first wireless systems to which the prescribed method is applied for the protection calculation.

4. The communication control apparatus according to claim 2, wherein the prescribed method includes a first method that preferentially allows at least one of the second wireless systems having lower interference to use a part of or a whole part of the interference margin.

5. The communication control apparatus according to claim 4, wherein the first method is a primary system protection method of low-interference node preferentially permitting mode.

6. The communication control apparatus according to claim 4, wherein the prescribed method includes a second method that simultaneously distributes a part of or a whole part of the interference margin to the second wireless systems.

7. The communication control apparatus according to claim 6, wherein the second method is a primary system protection method of interference-margin simultaneous distribution mode.

8. The communication control apparatus according to claim 4, wherein
for the protection calculation of at least one first wireless system out of the single or plurality of first wireless systems, a second method that simultaneously distributes a part of or whole part of the interference margin to the second wireless systems is applied, and
when the interference quantity given by the new second wireless system to the first wireless system to which the second method is applied for the protection calculation is larger than a residual interference margin of the first wireless system, the second determination circuit determines not to allow the new second wireless system to use the at least part of the frequency band.

9. The communication control apparatus according to claim 4, wherein
for the protection calculation of at least one first wireless system out of the single or plurality of first wireless systems, a second method that simultaneously distributes a part of or whole part of the interference margin to the second wireless systems is applied, and
when the interference quantity given by the new second wireless system to the first wireless system to which the second method is applied for the protection calculation is larger than a residual interference margin of the first wireless system, the second determination circuit corrects the operation parameter of the new second wireless system so as to become equal to or less than the residual interference margin of the first wireless system.

10. The communication control apparatus according to claim 9, wherein the second determination circuit determines whether or not the corrected operation parameter is acceptable for the new second wireless system and, when the corrected operation parameter is not acceptable, determines not to allow the new second wireless system to use the at least part of the frequency band.

11. The communication control apparatus according to claim 9, wherein the second determination circuit determines, based on the corrected operation parameter, whether or not to define the new second wireless system as the system to be forcibly stopped for the first wireless system to which the first method is applied.

12. The communication control apparatus according to claim 1, wherein the second determination circuit determines, based on an interference quantity given to the first wireless system by the new second wireless system and a residual interference margin of the first wireless system, whether or not to define the new second wireless system as the system to be forcibly stopped for the first wireless system.

13. The communication control apparatus according to claim 1,
wherein, when the interference quantity given to the first wireless system by the new second wireless system exceeds the largest applied interference quantity among the applied interference quantities of the second wireless systems currently defined as the systems to be forcibly stopped, the second determination circuit determines that the new second wireless system does not satisfy the prescribed additional condition.

14. The communication control apparatus according to claim 1,
wherein, when the new second wireless system is not a wireless system of a low-output class with an output smaller than a prescribed output, the second determination circuit determines that the new second wireless system does not satisfy the prescribed additional condition.

15. The communication control apparatus according to claim 1,
wherein, when the new second wireless system is not a wireless system placed indoors, the second determination circuit determines that the new second wireless system does not satisfy the prescribed additional condition.

16. The communication control apparatus according to claim 1, wherein, when the new second system is determined as the system to be forcibly stopped, the second determination circuit also determines a wireless system to be a slave of the new second wireless system as the system to be forcibly stopped.

17. A communication control method, comprising:
periodically determining an operation parameter related to radio transmission of each of a single or a plurality of second wireless systems that perform wireless communication 1w utilizing at least part of a frequency band used by a single or a plurality of first wireless systems;
when a radio-wave use request is received from a new second wireless system between determination periods of the operation parameter, determining whether or not to define the new second wireless system as a system to be forcibly stopped for the first wireless system;
making a notification to the new second wireless system regarding a radio-wave use permission before a next determination period of the operation parameter;
not defining the new second wireless system as the system to be forcibly stopped for the first wireless system in a case where an interference quantity given to the first wireless system by the new second wireless system is equal to or less than a residual interference margin of the first wireless system; and
defining the new second wireless system as the system to be forcibly stopped for the first wireless system in other cases.

* * * * *